United States Patent
Iwata et al.

(10) Patent No.: US 9,090,748 B2
(45) Date of Patent: Jul. 28, 2015

(54) NONAQUEOUS DISPERSION OF RESIN PARTICLES

(75) Inventors: Masakazu Iwata, Kyoto (JP); Kouji Oota, Kyoto (JP)

(73) Assignee: SANYO CHEMICAL INDUSTRIES, LTD., Kyoto-shi (JP)

( * ) Notice: Subject to any disclaimer, the term of this patent is extended or adjusted under 35 U.S.C. 154(b) by 19 days.

(21) Appl. No.: 13/641,236

(22) PCT Filed: Mar. 24, 2011

(86) PCT No.: PCT/JP2011/001724
§ 371 (c)(1),
(2), (4) Date: Oct. 15, 2012

(87) PCT Pub. No.: WO2011/129058
PCT Pub. Date: Oct. 20, 2011

(65) Prior Publication Data
US 2013/0034809 A1   Feb. 7, 2013

(30) Foreign Application Priority Data

Apr. 16, 2010   (JP) .................................. 2010-094668
Apr. 27, 2010   (JP) .................................. 2010-102649

(51) Int. Cl.
| | | |
|---|---|---|
| C08L 75/14 | (2006.01) |
| C08L 33/22 | (2006.01) |
| C09D 133/22 | (2006.01) |
| C09D 11/10 | (2014.01) |
| C09D 175/14 | (2006.01) |
| G03G 9/13 | (2006.01) |
| G03G 9/12 | (2006.01) |
| C08J 3/11 | (2006.01) |
| G03G 9/125 | (2006.01) |

(52) U.S. Cl.
CPC . *C08J 3/11* (2013.01); *G03G 9/125* (2013.01); *G03G 9/13* (2013.01); *G03G 9/131* (2013.01)

(58) Field of Classification Search
CPC .... C09D 133/22; C09D 11/10; C09D 175/14; G03G 9/13; G03G 9/12; G03G 9/0827; G03G 9/0897; G03G 9/0819

USPC ................ 524/487, 555, 590; 430/114, 112, 430/137.22
See application file for complete search history.

(56) References Cited

U.S. PATENT DOCUMENTS

2008/0199221 A1   8/2008  Teshima et al.

FOREIGN PATENT DOCUMENTS

| JP | 2006-243715 A | | 9/2006 |
| JP | 2007-011307 A | | 1/2007 |
| JP | 2008-225442 A | | 9/2008 |
| JP | 2009-030000 A | | 2/2009 |
| JP | 2009-096994 A | | 5/2009 |
| JP | 2009096994 A | * | 5/2009 |

OTHER PUBLICATIONS

JP2009-096994 A—machine translation.*
International Search Report for PCT/JP2011/001724, mailing date of Jun. 14, 2011.
Extended European Search Report dated Oct. 25, 2013, issued in corresponding EP Patent Application No. 11768585.9 (4 pages).

* cited by examiner

*Primary Examiner* — Ling Choi
*Assistant Examiner* — Ronald Grinsted
(74) *Attorney, Agent, or Firm* — Westerman, Hattori, Daniels & Adrian, LLP

(57) ABSTRACT

Provided is a nonaqueous dispersion of resin particles, in which the resin particles have uniform particle diameters and shapes and which exhibits excellent fixing properties, particularly when used as a liquid electrophotographic developer. More specifically, provided is a nonaqueous dispersion (X) in which resin particles (C) are dispersed in a nonhydrophilic organic solvent (L) that exhibits a relative permittivity of 1 to 4 at 20° C., the resin particles (C) being core-shell type resin particles each of which comprise a resin particle (B) that contains a resin (b) and fine particles (A) that contain a resin (a) and that either adhere to the surface of the resin particle (B) or form a film on the surface of the resin particle (B), wherein the solubility of (a) in (L) at 25° C. is 10 wt % or less relative to the weight of (a).

13 Claims, No Drawings

NONAQUEOUS DISPERSION OF RESIN PARTICLES

TECHNICAL FIELD

The present invention relates to a nonaqueous dispersion of resin particles. More specifically, the present invention relates to a nonaqueous dispersion of resin particles useful for various applications such as a liquid developer for electrophotography, a liquid developer for electrostatic recording, oil-based ink for inkjet printer, ink for electronic paper, and the like.

BACKGROUND ART

As the resin particles which are dispersed in the nonaqueous dispersion of resin particles, desired are those having a narrow particle size distribution and high dispersion stability. Above all, in such fields as the liquid developer for electrophotography, the liquid developer for electrostatic recording, the oil-based ink for inkjet printer, the ink for electronic paper, and the like, there are demands for resin particles having a small particle diameter and a narrow particle size distribution.

In addition, in the field of electrophotography, there is a strong desire for decreasing power consumption by printing machines such as printers and the like by fixing toners at lower temperatures.

Therefore, in order to solve these problems, there has been proposed a method wherein a fatty acid monoester is added in the nonaqueous dispersion medium and, at the same time, a polyester resin is selected as the main component of the toner (see Patent Document 1). This method was intended to improve the fixing property of the toner by plasticizing the polyester resin with the fatty acid monoester. However, the toner particles obtained showed poor dispersion stability and were not entirely satisfactory in either particle size distribution or fixing property.

PRIOR ART DOCUMENTS

Patent Documents

Patent Document 1: Japanese Patent Application Laid-Open No. 2008-225442

SUMMARY OF THE INVENTION

Problems to be Solved by the Invention

The object of the present invention is to provide a nonaqueous dispersion of resin particles having a uniform diameter and shape of resin particles, and having an excellent fixing property as a liquid developer for electrophotography.

Means for Solving the Problems

The present inventors conducted diligent research in order to solve the above-described problems and reached the present invention. That is, the present invention is a nonaqueous dispersion (X) in which resin particles (C) are dispersed in a nonhydrophilic organic solvent (L) that exhibits a relative permittivity of 1 to 4 at 20° C., the resin particles (C) being core-shell type resin particles each of which comprises a resin particle (B) that contains a resin (b) and fine particles (A) that contain a resin (a) and that either adhere to the surface of the resin particle (B) or form a film on the surface of the resin particle (B), wherein the solubility of (a) in (L) at 25° C. is 10 wt % or less relative to the weight of (a).

The present invention also provides a method for producing a nonaqueous dispersion (X), wherein resin particles (C) each of which comprising fine particles (A) adhered to or forming a film on the surface of a resin particle (B) are dispersed in a nonhydrophilic organic solvent (L), comprising mixing a fine particle dispersion (W) comprising fine particles (A) that contain a resin (a) dispersed in the nonhydrophilic organic solvent (L) that exhibits a relative permittivity of 1 to 4 at 20° C., and a resin solution (O1) having a resin (b) dissolved in an organic solvent (M) having a solubility parameter of 8.5 to 20 $(cal/cm^3)^{1/2}$ or a resin solution (O2) having a precursor (b0) of the resin (b) dissolved in (M); dispersing (O1) or (O2) in (W) and, when (O2) is used, reacting (b0) further to form the resin particle (B) containing (b) in (W), thereby to obtain a nonaqueous dispersion (X') of the resin particles (C) having a structure wherein the fine particles (A) are adhered to the surface of the resin particle (B); and further distilling off (M) from (X').

Effects of the Invention

The nonaqueous dispersion of resin particles of the present invention exhibits effects of having a uniform particle diameter and shape of the resin particles and having excellent heat-resistant stability as a liquid developer for electrophotography.

MODE FOR CARRYING OUT THE INVENTION

The resin (a) in the present invention may be either a thermoplastic resin or a thermosetting resin and includes, for example, vinyl resins, polyester resins, polyurethane resins, epoxy resins, polyamide resins, polyimide resins, silicon resins, phenol resins, melamine resins, urea resins, aniline resins, ionomer resins, polycarbonate resins, and the like. Furthermore, the resin (a) may be used in a combination of two or more of the above-described resins.

From a viewpoint that a nonaqueous dispersion of resin particles can be easily obtained, preferable among these are the vinyl resins, the polyester resins, the polyurethane resins, the epoxy resins, and combinations thereof. More preferable are the vinyl resins having (co)polymer skeletons of a vinyl monomer and, if necessary, other vinyl monomers, and particularly preferable, from a viewpoint that molecular chains (k) can be easily introduced as side chains of the resin (a), are vinyl resins which are (co)polymers of a vinyl monomer (m) having a molecular chain (k) and, if necessary, other vinyl monomers, and modifications thereof.

Modified vinyl resins can be obtained, for example, by synthesizing vinyl (co)polymers of vinyl monomers having functional groups such as a hydroxyl group, a carboxyl group, an amino group, and the like and a vinyl monomer (m) having a molecular chain (k) and, thereafter, carrying out reactions such as esterification, amidation, urethanization, and the like. Meanwhile, in the present invention, the term "(co)polymer" means a homopolymer or a copolymer of monomers.

The vinyl resins include (co)polymers obtained by homopolymerizing or copolymerizing vinyl monomers and are preferably (co)polymers of a vinyl monomer (m) having a molecular chain (k) and, if necessary, other vinyl monomers. The difference between solubility parameters (hereinafter abbreviated as SP values) of the molecular chain (k) in (m) and the nonhydrophilic organic solvent (L) is preferably 2 or less. In addition, the nonhydrophilic organic solvent (L) has a relative permittivity of 1 to 4 at 20° C.

The vinyl monomer (m) having a molecular chain (k) is not particularly limited but includes the following monomers (m1) to (m4) and the like, where two or more of these may also be used in combination.

Vinyl monomers (m1) having linear hydrocarbon chains having 12 to 27 (preferably 16 to 25) carbon atoms:

included are mono linear alkyl (the alkyl having 12 to 27 carbon atoms) esters of unsaturated monocarboxylic acids, unsaturated dicarboxylic acids, and the like, wherein the above-described unsaturated monocarboxylic acids and unsaturated dicarboxylic acids include carboxyl group-containing vinyl monomers having 3 to 24 carbon atoms, for example, (meth)acrylic acid, maleic acid, fumaric acid, crotonic acid, itaconic acid, citraconic acid, and the like. Meanwhile, the above-described (meth)acrylic acid means acrylic acid and/or methacrylic acid and hereinafter the same description will be used.

Specific examples include dodecyl(meth)acrylate, stearyl (meth)acrylate, behenyl(meth)acrylate, hexadecyl (meth)acrylate, heptadecyl(meth)acrylate, eicosyl (meth)acrylate, and the like.

Vinyl monomers (m2) having branched hydrocarbon chains having 12 to 27 (preferably 16 to 25) carbon atoms:

included are mono-branched alkyl (the alkyl having 12 to 27 carbon atoms) esters of unsaturated monocarboxylic acids and unsaturated dicarboxylic acids, wherein the unsaturated monocarboxylic acids and unsaturated dicarboxylic acids include the same compounds as those described for (m1).

Specific examples include 2-decyltetradecyl (meth)acrylate and the like.

Vinyl monomers (m3) having fluoroalkyl chains having 4 to 20 carbon atoms:

included are perfluoroalkyl (alkyl)(meth)acrylates represented by the following general formula, and the like:

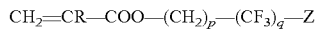

CH$_2$=CR—COO—(CH$_2$)$_p$—(CF$_3$)$_q$—Z wherein R represents a hydrogen atom or a methyl group; p represents an integer of 0 to 3; q represents any of 2, 4, 6, 8, 10, and 12; and Z represents a hydrogen atom or a fluorine atom.

Specific examples include [(2-perfluoroethyl)ethyl](meth)acrylate, [(2-perfluorobutyl)ethyl](meth)acrylate, [(2-perfluorohexyl)ethyl](meth)acrylate, [(2-perfluorooctyl)ethyl](meth)acrylate, [(2-perfluorodecyl)ethyl](meth)acrylate, and [(2-perfluorododecyl)ethyl](meth)acrylate.

Vinyl monomers (m4) having polydimethylsiloxane chains:

included are (meth)acryl-modified silicones represented by the following general formula, and the like:

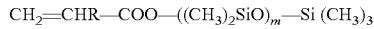

CH$_2$=CHR—COO—((CH$_3$)$_2$SiO)$_m$—Si(CH$_3$)$_3$ wherein R represents a hydrogen atom or a methyl group; and m has an average value of 15 to 45.

Specific examples include "X-22-174DX," "X-22-2426," "X-22-2475" (all produced by Shin-Etsu Silicone Co., Ltd.), and the like.

Among (m1) to (m4), preferable are (m1) and (m2), and more preferable is (m1).

Other vinyl monomers than the vinyl monomers (m) having molecular chains (k) as side chains include the following (1) to (10). Two or more of these may also be used in combination.

(1) Vinyl hydrocarbons:

(1-1) aliphatic vinyl hydrocarbons: alkenes (for example, ethylene, propylene, butene, isobutylene, pentene, heptene, diisobutylene, octene, dodecene, octadecene, α-olefins other than the foregoing, and the like); alkadienes (for example, butadiene, isoprene, 1,4-pentadiene, 1,6-hexadiene, 1,7-octadiene, and the like);

(1-2) alicyclic vinyl hydrocarbons: mono- or di-cycloalkenes and alkadienes (for example, cyclohexene, (di)cyclopentadiene, vinylcyclohexene, ethylidenebicycloheptene, and the like); terpenes (for example, pinene, limonene, indene, and the like);

(1-3) aromatic vinyl hydrocarbons: styrene or hydrocarbyl (alkyl, cycloalkyl, aralkyl, and/or alkenyl)-substituted derivatives thereof (for example, α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, trivinylbenzene, and the like); vinylnaphthalene and the like.

(2) Carboxyl group-containing vinyl monomers and metal salts thereof:

unsaturated monocarboxylic acids having 3 to 30 carbon atoms; and unsaturated dicarboxylic acids, anhydrides thereof, and monoalkyl (the alkyl group having 1 to 11 carbon atoms) esters thereof [for example, carboxyl group-containing vinyl monomers such as (meth)acrylic acid, maleic acid (anhydride), fumaric acid, crotonic acid, itaconic acid, citraconic acid, cinnamic acid, monomethyl maleate, monoethyl fumarate, monobutyl itaconate, and the like].

(3) Sulfonic group-containing vinyl monomers, vinyl sulfuric acid monoesters, and salts of these:

alkenesulfonic acids having 2 to 14 carbon atoms [for example, vinylsulfonic acid, (meth)allylsulfonic acid, methylvinylsulfonic acid, styrenesulfonic acid, and the like] and alkyl derivatives thereof, the alkyl groups having 2 to 24 carbon atoms (for example, α-methylstyrenesulfonic acid and the like); sulfo(hydroxy)alkyl-(meth)acrylates or (meth)acrylamides {for example, sulfopropyl(meth)acrylate, 2-hydroxy-3-(meth)acryloxypropylsulfonic acid, 2-(meth)acryloyloxyethanesulfonic acid, 3-(meth)acrylamide-2-hydroxypropanesulfonic acid, alkyl (having 3 to 18 carbon atoms) allylsulfosuccinic acid, poly(n=2~30)oxyalkylene (oxyethylene, oxypropylene, oxybutylene, and the like; may be homo, random, or block adducts) mono(meth)acrylate sulfuric acid esters [poly(n=5~15)oxypropylenemonomethacrylate sulfuric acid ester and the like], polyoxyethylene polycyclicphenyl ether sulfuric acid esters, and sulfuric acid esters or sulfonic acid group-containing monomers represented by the following general formulae (3-1) to (3-3) and the like}, salts thereof, and the like:

[Formula 1]

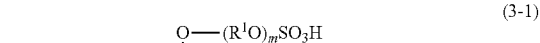

$$CH_2=CHCH_2OCH_2CHCH_2O-Ar-R^2 \quad (3\text{-}1)$$
$$| $$
$$O-(R^1O)_m SO_3H$$

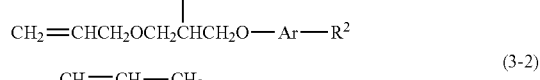

$$R^3-Ar-O-(R_1O)_n SO_3H \quad (3\text{-}2)$$
$$|$$
$$CH=CH-CH_3$$

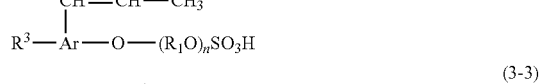

$$HO_3SCHCOOCH_2CH(OH)CH_2OCH_2CH=CH_2 \quad (3\text{-}3)$$
$$|$$
$$CH_2COOR^4$$

wherein R$^1$O is an oxyalkylene group having 2 to 4 carbon atoms, the R$^1$O being used either alone or in a combination of two or more, and when two or more are used in combination, the mode of bonding may be either random or block; R$^2$ and $R^3$ each independently represent an alkyl group having 1 to 15 carbon atoms; m and n each independently represent an integer of 1 to 50; Ar represents a benzene ring; and $R^4$ represents an alkyl group having 1 to 15 carbon atoms, which may be substituted with fluorine atoms.

(4) Phosphoric acid group-containing vinyl monomers and salts thereof:

(meth)acryloyloxyalkyl (having 1 to 24 carbon atoms) phosphoric acid monoesters [for example, 2-hydroxyethyl (meth)acryloyl phosphate, phenyl-2-acryloyloxyethyl phosphate, and the like]; (meth)acryloyloxyalkyl (having 1 to 24 carbon atoms) phosphoric acids (for example, 2-acryloyloxyethylphosphonic acid and the like).

In addition, the salts of the above-described (2) to (4) include metal salts, ammonium salts, amine salts (including quaternary ammonium salts), and the like. Metals which form the metal salts include Al, Ti, Cr, Mn, Fe, Zn, Ba, Zr, Ca, Mg, Na, K, and the like.

Preferable among these are alkali metal salts and amine salts, and more preferable are sodium salts and salts with tertiary monoamines having 3 to 20 carbon atoms.

(5) Hydroxyl group-containing vinyl monomers:

hydroxylstyrene, N-methylol(meth)acrylamide, hydroxyethyl(meth)acrylate, hydroxypropyl(meth)acrylate, polyethyleneglycol mono(meth)acrylate, (meth)allyl alcohol, propargyl alcohol, 2-hydroxyethyl propenyl ether, sucrose allyl ether, and the like.

(6) Nitrogen-containing vinyl monomers:

(6-1) amino group-containing vinyl monomers: aminoethyl (meth)acrylate, dimethylaminoethyl(meth)acrylate, diethylaminoethyl(meth)acrylate, morpholinoethyl (meth) acrylate, 4-vinylpyridine, 2-vinylpyridine, the salts of these, and the like;

(6-2) amide group-containing vinyl monomers: (meth) acrylamide, N-methyl(meth)acrylamide, methacrylformamide, N-vinylpyrrolidone, and the like;

(6-3) nitrile group-containing vinyl monomers: (meth) acrylonitrile, cyanostyrene, cyanoacrylate, and the like;

(6-4) quaternary ammonium cation group-containing vinyl monomers: quaternized products of tertiary amine group-containing vinyl monomers [for example, dimethylaminoethyl(meth)acrylate, diethylaminoethyl (meth)acrylate, diallylamine, and the like] (quaternization being carried out using quaternizing agents such as methyl chloride, dimethyl sulfate, benzyl chloride, dimethyl carbonate, and the like), and the like;

(6-5) nitro group-containing vinyl monomers: nitrostyrene and the like;

(6-6) urethane group-containing vinyl monomers: equimolar reaction products of hydroxyethyl(meth)acrylate with monofunctional isocyanate compounds (phenyl isocyanate, cyclohexyl isocyanate, and the like), equimolar reaction products of hydroxyethyl(meth)acrylate and polyalkylene glycol chains (the alkylene group having 2 to 4 carbon atoms) with difunctional isocyanate compounds (isophorone diisocyanate, hexyl diisocyanate, tolylene diisocyanate, and the like), and the like.

(7) Epoxy group-containing vinyl monomers:

glycidyl(meth)acrylate, tetrahydrofurfury (meth)acrylate, p-vinylphenylphenyl oxide, and the like.

(8) Vinyl monomers containing halogens other than fluorine:

vinyl chloride, vinyl bromide, vinylidene chloride, allyl chloride, chlorostyrene, bromostyrene, dichlorostyrene, chloromethylstyrene, chloroprene, and the like.

(9) Vinyl esters, vinyl (thio) ethers, vinyl ketones, and vinyl sulfones:

(9-1) vinyl esters {for example, vinyl acetate, diallyl phthalate, (meth)acrylic acid esters having alkyl groups (linear or branched) having 1 to 11 carbon atoms [methyl (meth)acrylate,ethyl(meth)acrylate, 2-ethylhexyl (meth)acrylate, and the like], dialkyl fumarates (fumaric acid dialkyl esters) (wherein the two alkyl groups may be linear, branched, or alicyclic groups having 2 to 8 carbon atoms), dialkyl maleates (maleic acid dialkyl esters) (wherein the two alkyl groups may be linear, branched, or alicyclic groups having 2 to 8 carbon atoms), poly(meth)allyloxyalkanes (diallyloxyethane, tetramethallyloxyethane, and the like), and the like}, vinyl monomers having polyalkylene glycol chains {polyethylene glycol [number average molecular weight (hereinafter abbreviated as Mn) of 300] mono(meth)acrylate, polypropylene glycol (Mn=500) monoacrylate, (meth)acrylate of an ethylene oxide (hereinafter ethylene oxide is abbreviated as EO) 10 moles adduct of methylalcohol, and (meth)acrylate of an EO 30 moles adduct of lauryl alcohol, and the like}, and poly(meth)acrylates [poly(meth)acrylates of polyhydric alcohols: ethylene glycol di(meth)acrylate, neopentyl glycol di(meth)acrylate, polyethylene glycol di(meth)acrylate, and the like], and the like;

(9-2) vinyl (thio) ethers (for example, vinyl methyl ether, vinyl 2-ethylmercaptoethyl ether, acetoxystyrene, phenoxystyrene, and the like);

(9-3) vinyl ketones (for example, vinyl methyl ketone, vinyl phenyl ketone, and the like) and vinyl sulfones (for example, divinyl sulfide, p-vinyldiphenyl sulfide, divinyl sulfoxide, and the like).

(10) Additional Vinyl Monomers:

isocyanatoethyl(meth)acrylate, m-isopropenyl-α,α-dimethylbenzyl isocyanate, and the like.

Preferable among the other vinyl monomers are vinyl esters such as alkyl(meth)acrylates having alkyl groups having 1 to 11 carbon atoms, vinyl monomers having polyalkylene glycol chains, and the like; carboxyl group-containing vinyl monomers; sulfone group-containing vinyl monomers; amino group-containing vinyl monomers; and urethane group-containing vinyl monomers.

More preferable are: among the alkyl(meth)acrylates having alkyl groups having 1 to 11 carbon atoms, methyl (meth) acrylate, butyl(meth)acrylate, and 2-ethylhexyl (meth)acrylate; among the vinyl monomers having polyalkylene glycol chains, polyethylene glycol(meth)acrylate ester ["Blenmer PE-350" (produced by NOF Corporation) and the like]; among the carboxyl group-containing vinyl monomers, (meth)acrylic acid, crotonic acid, itaconic acid, and maleic acid; among the sulfone group-containing vinyl monomers, alkyl (having 3 to 18 carbon atoms) allyl sulfosuccinic acid ["Eleminol JS-2" (produced by Sanyo Chemical Ind., Ltd.) and the like] and sulfuric acid ester of poly(n=2~30)oxyalkylene (oxyethylene, oxypropylene, oxybutylene, and the like; may be homo, random, or block adducts) mono(meth)acrylate ["Eleminol RS-30" (manufactured by Sanyo Chemical Ind., Ltd.) and the like]; among the amino group-containing vinyl monomers, aminoethyl(meth)acrylate, dimethylaminoethyl(meth)acrylate, and diethylaminoethyl(meth)acrylate; and among the urethane group-containing vinyl monomers, an equimolar reaction product of hydroxyethyl(meth)acrylate and phenyl isocyanate.

Specific examples of the vinyl resins include, as combinations of their constituent monomers, alkyl (linear and/or branched) (meth)acrylate-acrylic acid; vinyl acetate-(meth) acrylic acid-(meth)acrylic acid esters; alkyl (linear and/or branched) (meth)acrylate-polyethylene glycol (meth)acrylate; alkyl (linear and/or branched) (meth)acrylate-(meth) acrylic acid-polyethylene glycol (meth)acrylate; alkyl (linear and/or branched) (meth)acrylate-diethylaminoethyl (meth) acrylate-polyethylene glycol (meth)acrylate; alkyl (linear and/or branched) (meth)acrylate-polyethylene glycol (meth) acrylate-an equimolar reaction product of hydroxyethyl (meth)acrylate and phenyl isocyanate; alkyl (linear and/or branched) (meth)acrylate-(meth)acrylic acid-polyethylene glycol(meth)acrylate-an equimolar reaction product of hydroxyethyl(meth)acrylate and phenyl isocyanate; salts of copolymers of these monomers; and the like.

Preferable among these are alkyl (linear and/or branched) (meth)acrylate-(meth)acrylic acid-polyethylene glycol (meth)acrylate; alkyl (linear and/or branched) (meth)acrylate-(meth)acrylic acid-dimethylaminoethyl (meth)acrylate-polyethylene glycol(meth)acrylate; alkyl (linear and/or branched) (meth)acrylate-polyethylene glycol (meth)acrylate; alkyl (linear and/or branched) (meth)acrylate-diethylaminoethyl (meth)acrylate-polyethylene glycol(meth)acrylate; alkyl (linear and/or branched) (meth)acrylate-polyethylene glycol (meth)acrylate-an equimolar reaction product of hydroxyethyl (meth)acrylate and phenyl isocyanate; and alkyl (linear and/or branched) (meth)acrylate-(meth) acrylic acid-polyethylene glycol(meth)acrylate-an equimolar reaction product of hydroxyethyl(meth)acrylate and phenyl isocyanate.

The content of the vinyl monomer (m) having a molecular chain (k) in the vinyl monomers constituting the vinyl polymer is preferably 10 wt % or more, more preferably 10 to 90 wt %, particularly preferably 15 to 80%, and most preferably 20 to 60 wt %.

When the content is in these ranges, it becomes difficult for the resin particles (C) to coalesce with each other.

When the resin (a) has a (co) polymer skeleton of the vinyl monomer (m) having the molecular chain (k) and, if necessary, other vinyl monomers, and when, as (m), a vinyl monomer (m1) having a linear hydrocarbon chain having 12 to 27 carbon atoms and a vinyl monomer (m2) having a branched hydrocarbon chain having 12 to 27 carbon atoms are used, the weight ratio of (m1) and (m2) is, from viewpoints of particle diameters and fixing properties of the resin particles, preferably 90:10 to 10:90, more preferably 80:20 to 20:80, and particularly preferably 70:30 to 30:70.

The polyester resins include polycondensation products of polyols with polycarboxylic acids, acid anhydrides thereof, or low alkyl esters thereof; metal salts of these polycondensation products; and the like.

The polyols include diols (11) and 3- to 8- or more-hydric polyols (12).

The polycarboxylic acids, the acid anhydrides thereof, or the low alkyl esters thereof include dicarboxylic acids (13), 3- to 6- or more-basic polycarboxylic acids (14), and acid anhydrides or low alkyl esters of these.

The reaction ratio of the polyols and the polycarboxylic acids, as an equivalent ratio of hydroxyl groups [OH] and carboxyl groups [COOH], i.e., [OH]/[COOH], is preferably 2/1 to 1/5, more preferably 1.5/1 to 1/4, and particularly preferably 1/1.3 to 1/3.

The diols (11) include alkylene glycols having 2 to 36 carbon atoms (ethylene glycol, 1,2-propylene glycol, 1,6-hexanediol, dodecanediol, neopentyl glycol, 2,2-diethyl-1,3-propanediol, and the like); alkylene ether glycols having 4 to 36 carbon atoms (diethylene glycol, dipropylene glycol, polyethylene glycol, polypropylene glycol, polytetramethyleneether glycol, and the like); alicyclic diols having 4 to 36 carbon atoms (1,4-cyclohexanedimethanol, hydrogenated bisphenol A, and the like); adducts (the number of moles added: 1 to 120) of alkylene oxide (hereinafter abbreviated as AO) [for example EO, propylene oxide (hereinafter abbreviated as PO), butylene oxide (hereinafter abbreviated as BO), and the like] to the above-described alkylene glycols or alicyclic diols; adducts (the number of moles added: 2 to 30) of AO (EO, PO, BO, and the like) to bisphenols (bisphenol A, bisphenol F, bisphenol S, and the like); polylactonediols (poly-ε-caprolactonediol and the like); polybutadienediol and the like.

In addition to the above-described diols having no functional groups other than hydroxyl groups, there may be used those which contain other functional groups as the diols (11). The examples include diols having carboxyl groups, diols having sulfonic acid groups or sulfamic acid groups, salts of these, and the like.

The diols having carboxyl groups include dialkylolalkanoic acids [those having 6 to 24 carbon atoms; for example, 2,2-dimethylolpropionic acid (DMPA), 2,2-dimethylolbutanoic acid, 2,2-dimethylolheptanoic acid, 2,2-dimethyloloctanoic acid, and the like].

The diols having sulfonic acid groups or sulfamic acid groups include 3-(2,3-dihydroxypropoxy)-1-propanesulfonic acid, di(ethylene glycol) ester of sulfoisophthalic acid, sulfamic acid diols [N,N-bis(2-hydroxyalkyl)sulfamic acid (the alkyl group having 1 to 6 carbon atoms) and AO adducts thereof (the AO including EO, PO, and the like; the number of moles of AO added being 1 to 6): for example, N,N-bis(2-hydroxyethyl)sulfamic acid, N,N-bis(2-hydroxyethyl) sulfamic acid PO 2 moles adduct, and the like], bis(2-hydroxyethyl) phosphate, and the like.

Bases to neutralize these diols having acid groups include, for example, the above-described tertiary amines having 3 to 30 carbon atoms (triethylamine and the like) and/or alkali metals (sodium and the like).

Preferable among these are alkylene glycols having 2 to 12 carbon atoms, diols having carboxyl groups, AO adducts of bisphenols, and combinations of these.

The 3- to 8- or more-hydric polyols (12) include 3- to 8- or more-hydric aliphatic alcohols having 3 to 36 carbon atoms (alkanepolyols and intramolecular or intermolecular dehydration products thereof, for example, glycerin, trimethylolethane, trimethylolpropane, pentaerythritol, sorbitol, sorbitan, polyglycerin, and the like; sugars and derivatives thereof, for example, sucrose, methyl glycoside, and the like); AO adducts of polyhydric aliphatic alcohols (number of moles added: 2 to 120); AO adducts of trisphenols (trisphenol PA and the like) (number of moles added: 2 to 30); AO adducts of novolac resins (phenol novolac, cresol novolac, and the like) (number of moles added: 2 to 30); acrylic polyols [copolymers of hydroxyethyl(meth)acrylate and other vinyl monomers, and the like]; and the like.

Preferable among these are 3- to 8- or more-hydric aliphatic alcohols and AO adducts of novolac resins, and more preferable are AO adducts of novolac resins.

The dicarboxylic acids (13) include alkanedicarboxylic acids (succinic acid, adipic acid, sebacic acid, azelaic acid, dodecanedicarboxylic acid, octadecanedicarboxylic acid, decylsuccinic acid, and the like) and alkenylsuccinic acids (dodecenylsuccinic acid, pentadecenylsuccinic acid, octadecenylsuccinic acids, and the like), both having 4 to 36 carbon atoms; alicyclic dicarboxylic acids having 6 to 40 carbon atoms [dimer acid (dimerized linoleic acid) and the like]; alkenedicarboxylic acids having 4 to 36 carbon atoms (maleic acid, fumaric acid, citraconic acid, and the like); aromatic dicarboxylic acids having 8 to 36 carbon atoms (phthalic acid, isophthalic acid, terephthalic acid, naphthalenedicarboxylic acid, and the like); and the like.

Preferable among these are alkenedicarboxylic acids having 4 to 20 carbon atoms and aromatic dicarboxylic acids having 8 to 20 carbon atoms.

The 3- to 6- or more-basic polycarboxylic acids (14) include aromatic polycarboxylic acids having 9 to 20 carbon atoms (trimellitic acid, pyromellitic acid, and the like) and the like.

Meanwhile, as the dicarboxylic acids (13) or 3- to 6- or more-basic polycarboxylic acids (14), acid anhydrides and lower alkyl (having 1 to 4 carbon atoms) esters (methyl ester, ethyl ester, isopropyl ester, and the like) of the above-described compounds may also be used.

The polyester resins used in the present invention may be those produced in the same manner as in production of ordinary polyester resins. For example, the resin may be one obtained by a reaction under an atmosphere of an inert gas (nitrogen and the like) at a reaction temperature of preferably 150 to 280° C. for a reaction time of preferably 30 minutes or more.

Hereat, an esterification catalyst may be used if necessary. The esterification catalysts include tin-containing catalysts (for example, dibutyltin oxide and the like), antimony trioxide, titanium-containing catalysts {for example, titanium alkoxide, potassium titanate oxalate, titanium terephthalate, catalysts described in Japanese Patent Laid-Open No. 2006-243715 [titanium dihydroxybis(triethanolaminate), titanium monohydroxytris(triethanolaminate), an intramolecular polycondensation products thereof, and the like], catalysts described in Japanese Patent Laid-Open No. 2007-11307 (titanium tributoxy terephthalate, titanium triisopropoxy terephthalate, titanium diisopropoxy diterephthalate, and the like)}, zirconium-containing catalysts (for example, zirconyl acetate and the like), zinc acetate, and the like.

The polyurethane resins include polyaddition products of polyisocyanates (15) and active hydrogen-containing compounds {water, polyols [the diols (11) (including diols (11a) having functional groups other than hydroxyl groups) and 3- to 8- or more-hydric polyols (12)], polycarboxylic acids [the dicarboxylic acids (13) and 3- to 6- and more-basic polycarboxylic acids (14)], polyester polyols obtained by polycondensation of polyols and polycarboxylic acids, ring-opening polymers of lactones having 6 to 12 carbon atoms, polyamines (16), polythiols (17), combinations of these, and the like}; amino group-containing polyurethane resins obtained by reacting prepolymers having terminal isocyanate groups with primary and/or secondary monoamines (18) in amounts equimolar to the isocyanate groups of the prepolymers, the prepolymers being obtained by reactions of (15) with active hydrogen-containing compounds; and the like.

The content of carboxyl groups in the polyurethane resins is preferably 0.1 to 10 wt %.

The diols (11), 3- to 8- or more-hydric polyols (12), dicarboxylic acids (13), and 3- to 6- or more-basic polycarboxylic acids (14) include those described above and preferable ones are also the same.

The polyisocyanates (15) include aromatic polyisocyanates having 6 to 20 carbon atoms (excluding carbon atoms in the isocyanate groups; hereinafter, the same shall apply), aliphatic polyisocyanates having 2 to 18 carbon atoms, alicyclic polyisocyanates having 4 to 15 carbon atoms, aromatic aliphatic polyisocyanates having 8 to 15 carbon atoms, modified compounds of these polyisocyanates (modified compounds containing a urethane group, a carbodiimide group, an allophanate group, a urea group, a biuret group, a uretdione group, a uretimine group, an isocyanurate group, an oxazolidone group, and the like), mixtures of two or more of these, and the like.

Specific examples of the aromatic polyisocyanates include 1,3- or 1,4-phenylene diisocyanate, 2,4- or 2,6-tolylene diisocyanate (TDI), crude TDI, 2,4'- or 4,4'-diphenylmethane diisocyanate (MDI), crude MDI {a phosgenation product of crude diaminophenylmethane [a condensation product of formaldehyde and an aromatic amine (aniline) or a mixture thereof; a mixture of diaminodiphenylmethane and a small amount (for example, 5 to 20 wt %) of 3- or more-functional polyamines]: polyaryl polyisocyanate (PAPI)}, 4,4',4"-triphenylmethane triisocyanate, m- or p-isocyanatophenylsulfonyl isocyanate, and the like.

Specific examples of the aliphatic polyisocyanates include ethylene diisocyanate, tetramethylene diisocyanate, hexamethylene diisocyanate (HDI), dodecamethylene diisocyanate, 2,2,4-trimethylhexamethylene diisocyanate, 2-isocyanatoethyl-2,6-diisocyanatohexanoate, and the like.

Specific examples of the alicyclic polyisocyanates include isophorone diisocyanate (IPDI), dicyclohexylmethane-4,4'-diisocyanate (hydrogenated MDI), cyclohexylene diisocyanate, methylcyclohexylene diisocyanate (hydrogenated TDI), and the like.

Specific examples of the aromatic aliphatic polyisocyanates include m- or p-xylylene diisocyanate (XDI), α,α,α',α'-tetramethylxylylene diisocyanate (TMXDI), and the like.

Specific examples of the modified compounds of the polyisocyanates include compounds containing a urethane group, a carbodiimide group, an allophanate group, a urea group, a biuret group, a uretdione group, a uretimine group, an isocyanurate group, an oxazolidone group, and the like.

Specifically, there may be mentioned modified MDI (urethane-modified MDI, carbodiimide-modified MDI, trihydrocarbyl phosphate-modified MDI, and the like), urethane-modified TDI, and mixtures of two or more of these [for example, a combination of modified MDI and urethane-modified TDI (isocyanate-containing prepolymers) and the like].

Among these, preferable are aromatic polyisocyanates having 6 to 15 carbon atoms, aliphatic polyisocyanates having 4 to 12 carbon atoms, and alicyclic polyisocyanates having 4 to 15 carbon atoms; and more preferable are TDI, MDI, HDI, hydrogenated MDI, and IPDI.

The polyamines (16) include aliphatic polyamines (having 2 to 18 carbon atoms): (1) aliphatic polyamines {alkylene diamines having 2 to 6 carbon atoms (ethylenediamine, propylenediamine, trimethylenediamine, hexamethylenediamine, and the like), polyalkylene (having 2 to 6 carbon atoms) polyamines [diethylenetriamine, iminobispropylamine, bis(hexamethylene)triamine, tetraethylenepentamine, pentaethylenehexamine, and the like]}; (2) alkyl(having 1 to 4 carbon atoms)- or hydroxyalkyl (having 2 to 4 carbon atoms)-substituted compounds of these [dialkyl (having 1 to 3 carbon atoms) aminopropylamine, aminoethylethanolamine, 2,5-dimethyl-2,5-hexamethylenediamine, methyl iminobispropyl amine, and the like]; (3) alicyclic or heterocyclic ring-containing aliphatic polyamines {3,9-bis(3-aminopropyl)-2,4,8,10-tetraoxaspiro[5,5]undecane and the like}; and (4) aromatic ring-containing aliphatic amines (having 8 to 15 carbon atoms) (xylylenediamine, tetrachloro-p-xylylenediamine, and the like), alicyclic polyamines (having 4 to 15 carbon atoms): 1,3-diaminocyclohexane, isophoronediamine, 4,4'-methylenedicyclohexanediamine (hydrogenated methylenedianiline), and the like, heterocyclic polyamines (having 4 to 15 carbon atoms): piperazine, N-aminoethylpiperazine, 1,4-diaminoethylpiperazine, 1,4-bis(2-amino-2-methylpropyl)piperazine, and the like, aromatic polyamines (having 6 to 20 carbon atoms): (1) unsubstituted aromatic polyamines [1,2-, 1,3-, or 1,4-phenylenediamine, 2,4'- or 4,4'- diphenylmethanediamine, diaminodiphenylsulfone, m-aminobenzylamine, naphthylenediamine, and the like]; (2) aromatic polyamines nucleus-substituted with alkyl groups (the alkyl groups having 1 to 4 carbon atoms such as a methyl group, an ethyl group, an n— or iso-propyl group, a butyl group, and the like) [for example, 2,4- or 2,6-tolylenediamine, 1,3-dimethyl-2,6-diaminobenzene, 3,3',5,5'-tetraisopropyl-4.4'-diaminodiphenylsulfone, and the like], and mixtures of the isomers of these at various ratios; (3) aromatic polyamines having nucleus-substituted electron-withdrawing groups (halogen atoms such as a fluorine atom, a chlorine atom, a bromine atom, an iodine atom, and the like; alkoxy groups such as a methoxy group and an ethoxy group; a nitro group, and the like) [methylenebis-o-chloroaniline, 4-bromo-1,3-phenylenediamine, 2,5-dichloro-1,4-phenylenediamine, 4-aminophenyl-2-chloroaniline, and the like]; (4) aromatic polyamines having secondary amino groups [those obtained by substituting a part of or all of —$NH_2$ of the above-described aromatic polyamines (1) to (3) with —NH—R' (R' is an alkyl group, for example, a lower alkyl group such as a methyl group, an ethyl group, and the like)][4,4'-di(methylamino)diphenylmethane, 1-methyl-2-methylamino-4-aminobenzene, and the like], polyamide polyamines [low molecular weight polyamide polyamines obtained by condensation of dicarboxylic acids (dimer acid and the like) and excessive (2 moles or more per 1 mole of acid) polyamines (the above-described alkylenediamines, polyalkylenepolyamines, and the like), and the like], polyether polyamines [hydrogenated products of cyanoethylated compounds of polyether polyols (polyalkylene glycols and the like), and the like].

The polythiols (17) include alkanedithiols having 2 to 36 carbon atoms (ethylenedithiol, 1,4-butanedithiol, 1,6-hexanedithiol, and the like) and the like.

The primary and/or secondary amines (18) include alkylamines having 2 to 24 carbon atoms (ethylamine, n-butylamine, isobutylamine, and the like) and the like.

The epoxy resins include ring-opening polymerization products of polyepoxides (19), polyaddition products of polyepoxides (19) with active hydrogen group-containing compounds {water, polyols [the diols (11) and 3- to 8- or more-hydric polyols (12)], the dicarboxylic acids (13), the 3- to 6- or more-basic polycarboxylic acids (14), the polyamines (16), the polythiols (17), and the like}, and cured products of the polyepoxides (19) and dicarboxylic acids (13) or anhydrides of 3- to 6- or more-basic polycarboxylic acids (14), and the like.

The polyepoxides (19) used in the present invention are not particularly limited as long as they have two or more epoxy groups in one molecule. Preferable as the polyepoxides (19), from a viewpoint of mechanical properties of the cured products, are those having 2 to 6 epoxy groups in one molecule. The epoxy equivalent (molecular weight per epoxy group) of the polyepoxides (19) is preferably 65 to 1,000, and more preferably 90 to 500. When the epoxy equivalent is 1,000 or less, the cross-linked structure becomes strong and water resistance, chemical resistance, and physical properties such as mechanical strength and the like of the cured products are improved. On the other hand, it is difficult to synthesize an epoxy resin having an epoxy equivalent of less than 65.

Specific examples of the polyepoxides (19) include aromatic polyepoxy compounds, heterocyclic polyepoxy compounds, alicyclic polyepoxy compounds, aliphatic polyepoxy compounds, and the like.

The aromatic polyepoxy compounds include glycidyl ethers and glycidyl esters of polyhydric phenols, glycidyl aromatic polyamines, glycidylated products of aminophenols, and the like. The glycidyl ethers of polyhydric phenols include bisphenol F diglycidyl ether, bisphenol A diglycidyl ether, bisphenol B diglycidyl ether, bisphenol AD diglycidyl ether, bisphenol S diglycidyl ether, and the like. The glycidyl esters of polyhydric phenols include phthalic acid diglycidyl ester, isophthalic acid diglycidyl ester, terephthalic acid diglycidyl ester, and the like. The glycidyl aromatic polyamines include N,N-diglycidylaniline, N,N,N',N'-tetraglycidyldiphenylmethanediamine, and the like. Furthermore, in the present invention, the aromatic polyepoxy compounds include triglycidyl ether of p-aminophenol, a diglycidyl urethane compound obtained by an addition reaction of tolylene diisocyanate or diphenylmethane diisocyanate and glycidol, glycidyl group-containing polyurethane (pre)polymers obtained by reacting polyols to the preceding two reaction products, and diglycidyl ethers of AO (EO, PO, and the like) adducts of bisphenol A.

The heterocyclic polyepoxy compounds include trisglycidylmelamine and the like.

The alicyclic polyepoxy compounds include vinylcyclohexene dioxide and the like. In addition, the alicyclic polyepoxy compounds include nuclear hydrogenated products of the aromatic polyepoxy compounds.

The aliphatic polyepoxy compounds include polyglycidyl ethers of polyhydric aliphatic alcohols, polyglycidyl esters of polybasic fatty acids, glycidyl aliphatic amines, and the like. The polyglycidyl ethers of polyhydric aliphatic alcohols include ethylene glycol diglycidyl ether, tetramethylene glycol diglycidyl ether, polyethylene glycol diglycidylether, polypropylene glycol diglycidyl ether, and the like. The polyglycidyl esters of polybasic fatty acids include diglycidyl oxalate, diglycidyl maleate, and the like. The glycidyl aliphatic amines include N,N,N',N'-tetraglycidylhexamethylenediamine. Furthermore, in the present invention, the aliphatic polyepoxy compounds include a (co)polymer of diglycidyl ether and glycidyl (meth)acrylate.

Among the polyepoxides (19), preferable are aliphatic polyepoxy compounds and aromatic polyepoxy compounds. In addition, polyepoxides (19) may be used in a combination of two or more.

The polyamide resins include ring-opening polymers of lactams, polycondensation products of aminocarboxylic acids, polycondensation products of polycarboxylic acids and polyamines, and the like.

The polyimide resins include aliphatic polyimide resins (polymers obtained from aliphatic carboxylic acid dianhydrides and aliphatic diamines, and the like), aromatic polyimide resins (polymers obtained from aromatic carboxylic acid dianhydrides and aliphatic diamines or aromatic diamines, and the like), and the like.

The silicon resins include polymers having silicon-silicon bonds, silicon-carbon bonds, siloxane bonds, silicon-nitrogen bonds, and the like in molecular chains (polysiloxanes, polycarbosilanes, polysilazanes, and the like), and the like.

The phenol resins include polymers obtained by condensation of phenols (phenol, cresol, nonylphenol, lignin, resorcin, catechol, and the like) and aldehydes (formaldehyde, acetaldehyde, furfural, and the like), and the like.

The melamine resins include polymers obtained by polycondensation of melamine and formaldehyde, and the like.

The urea resins include polymers obtained by polycondensation of urea and formaldehyde, and the like.

The aniline resins include polymers obtained by polymerizing aniline and aldehydes under acidic conditions, and the like.

The ionomer resins include copolymers of vinyl monomers (α-olefins, styrene-based monomers, and the like) and α,β- unsaturated carboxylic acids (acrylic acid, methacrylic acid, maleic acid, itaconic acid, maleic acid monomethyl ester, maleic anhydride, maleic acid monoethyl ester, and the like), wherein a part or all of carboxylic acids in the copolymers are carboxylic acid salts (potassium salts, sodium salts, magnesium salts, calcium salts, and the like), and the like.

The polycarbonate resins include polycondensation products of bisphenols (bisphenol A, bisphenol F, bisphenol S, and the like) and phosgene, carbonic acid diesters, or the like; and the like.

In the present invention, solubility of the resin (a) in the nonhydrophilic organic solvent (L) at 25° C. is 10 wt % or less based on the weight of (a), preferably 7 wt % or less, and more preferably 3 wt % or less. If the solubility exceeds 10 wt %, the resin particles (C) do not take the designed core-shell structure, dispersion stability of the resin particles (C) worsens, and fixing properties when (C) is fabricated into toner are lowered.

The solubility of the resin (a) in the nonhydrophilic organic solvent (L) is measured by the following method.

<Method for Measuring Solubility>

A nonaqueous resin dispersion (10 g) is centrifuged at 25° C. at 10,000 rpm for 30 minutes and all of the supernatant liquid is recovered. To the residual solid, 10 mL of (L) is added and the nonaqueous dispersion resin particles are dispersed again. Thereafter, the dispersion is centrifuged at 25° C. at 10,000 rpm for 30 minutes and all of the supernatant liquid is recovered. This procedure is repeated further and the supernatant liquid is recovered three times in total. The supernatant liquid is dried in a vacuum dryer under a vacuum of 20 mmHg at the same temperature as the boiling point of (L) for 1 hour and the weight of the residue is weighed. When the weight of this residue is denoted by Y (g) and the mass of (a) in 10 g of the nonaqueous resin dispersion by y (g), then the solubility of (a) in (L) at 25° C., based on the weight of (a), can be calculated by the following formula:

Solubility (wt %)=(Y/y)×100

The contact angle between the resin (a) in the present invention and liquid paraffin is preferably 41° or less. In addition, the density of liquid paraffin is 0.88 g/ml.

The contact angle between the resin (a) and liquid paraffin can be measured by the following method.

<Method for Measuring Contact Angle>

A solution of the resin (a) dissolved to 40 wt % in a solvent which can dissolve (a) is coated on a glass plate by using an applicator in such a way that the film thickness after drying becomes at least 50 μm. Subsequently, the film is dried for 1 hour in a dryer at the same temperature as the boiling point of the solvent, which is distilled off.

A drop of liquid paraffin is dropped on the film of the resin (a) obtained and the contact angle is measured ten times per sample by a fully-automatic interfacial tensiometer, "Model PD-W" (manufactured by Kyowa Interface Science Co., Ltd) in a contact angle measurement mode. An average of ten measurements is taken as the contact angle.

The resin (a) may be either a crystalline resin or a amorphous resin, with the crystalline resin being preferable from a viewpoint of fixing properties. Furthermore, the crystalline resin and the amorphous resin may be used in combination.

When the resin (a) in the present invention is a crystalline resin, the heat of melting of (a) measured by differential scanning calorimetry (DSC) preferably satisfies the following relational expressions (1) and (2):

$$5 \leq H1 \leq 70 \quad (1)$$

$$0.2 \leq H2/H1 \leq 1.0 \quad (2)$$

wherein H1 in the relational expressions (1) and (2) represents the heat of melting (J/g) at the time of first temperature elevation measured by DSC and H2 represents the heat of melting (J/g) at the time of second temperature elevation as measured by DSC.

H1 is an index of the rate of melting of the resin (a). A resin having heat of melting is preferable in that the resin can be melted with a small amount of energy because it has a sharp melting property. However, when the heat of melting is too large, energy is consumed while melting and, thus, the resin does not melt sufficiently.

H1 is preferably $5 \leq H1 \leq 70$, more preferably $6 \leq H1 \leq 65$, and particularly preferably $7 \leq H1 \leq 65$.

H2/H1 in the relational expression (2) is an index of the rate of crystallization of the resin (a). In applications where the resin particles are first melted and used after cooling, if the resin particles contain crystalline components which did not crystallize, there may occur such phenomena as that the resistance value of the resin particles is lowered and that the resin particles become plasticized; thus, the performance of the resin particles sometimes differs from that designed initially. Therefore, it is necessary that the crystalline components in the resin crystallize immediately so as not to adversely affect the performance of the resin particles.

H2/H1 is preferably $0.2 \leq H2/H1 \leq 1.0$, wherein the lower limit is more preferably 0.3 or more, and particularly preferably 0.4 or more. The upper limit approaches 1.0 if the rate of crystallization of the resin (a) is fast and, therefore, the more preferable and particularly preferable upper limits are both 1.0. In addition, although H2/H1 does not exceed 1.0 theoretically, H2/H1 in actual measured values of DSC sometimes exceed 1.0. This point shall also be included in the claims.

H1 and H2 can be measured in accordance with JIS K7122 (1987), "Testing methods for heat of transitions of plastics." Specifically, the resin (a) (5 mg) is sampled into an aluminum pan, and temperature of the endothermic peak (the melting point) due to melting is measured by a differential scanning calorimeter (DSC) [for example, "RDC 220" (manufacture by SII Nano Technology, Inc.), "DSC 20" (manufactured by Seiko Electronics Inc.), and the like] at a temperature elevation rate of 10° C./minute. From the area of the endothermic peak, H1 can be calculated. Furthermore, after measurement of H1, the system is cooled to 0° C. at a cooling rate of 90° C./minute and, thereafter, the temperature (the melting point) of the endothermic peak due to melting is measured and, from the area of the endothermic peak, H2 is calculated.

The melting point of the resin (a) is preferably 0 to 220° C., more preferably 30 to 200° C., and particularly preferably 40 to 80° C. From viewpoints of particle size distribution, powder flowability, and heat resistance and anti-stress property during storage of the resin particles (C), if the melting point of the resin (a) is lower than the temperature at which the nonaqueous dispersion of resin particles are prepared, the effects of preventing coalescence and preventing disintegration become smaller, and the effect of narrowing the particle size distribution becomes less.

In addition, the melting point can be measured by a method specified in ASTM D3418-82 (DSC method) by using "DSC 20" or "SSC/580" (both manufactured by Seiko Electronics Inc.).

The Mn of the resin (a) [as measured by gel permeation chromatography (hereinafter abbreviated as GPC)] is preferably 100 to 5,000,000, more preferably 200 to 5,000,000, and particularly preferably 500 to 500,000.

The SP value is preferably 7 to 18 $(cal/cm^3)^{1/2}$, and more preferably 8 to 14 $(cal/cm^3)^{1/2}$.

In the present invention, the Mn and weight average molecular weight (hereinafter abbreviated as Mw) of a resin are measured with a tetrahydrofuran (hereinafter abbreviated as THF)-soluble component by using GPC under the following conditions:

equipment (an example): "HLC-8120" (manufactured by Tosoh Corporation);
column (an example): "TSKgel GMHXL" (two columns) "TSKgel Multipore HXL-M" (one column);
sample solution: 0.25 wt % solution in THF;
amount of solution injected: 100 μl;
flow rate: 1 ml/minute;
temperature of measurement: 40° C.;
detecting device: refractive index detector;
standard material: standard polystyrenes (TSK standard POLYSTYRENE) 12 samples (molecular weight: 500, 1,050, 2,800, 5,970, 9,100, 18,100, 37,900, 96,400, 190,000, 355,000, 1,090,000, 2,890,000) (manufactured by Tosoh Corporation).

Further, the Mn and Mw of the polyurethane resins are measured by using GPC under the following conditions:

equipment (an example): "HLC-8220GPC" manufactured by Tosoh Corporation;
column (an example): "Guardcolumn α" (one column) "TSKgel α-M" (one column);
sample solution: 0.125 wt % solution in dimethylformamide;
amount of solution injected: 100 μl;
flow rate: 1 ml/minute;
temperature of measurement: 40° C.
Detecting device: refractive index detector;
standard material: standard polystyrenes (TSK standard POLYSTYRENE) 12 samples (molecular weight: 500, 1,050, 2,800, 5,970, 9,100, 18,100, 37,900, 96,400, 190,000, 355,000, 1,090,000, 2,890,000).

While any method may be used for producing the fine particles (A) containing the resin (a), specific examples include a production method by a dry process [a method where the material (a) constituting the fine particles (A) is dry-milled by a heretofore known dry mills including a jet mill and the like] and a production method by a wet process [a method where the powder of (a) is dispersed in an organic solvent and is wet-milled by heretofore known wet dispersers including a bead mill, a roll mill, and the like; a method where a solution of (a) in a solvent is spray dried by means of a spray dryer and the like; a method where a solution of (a) in a solvent is oversaturated by addition of a poor solvent or by cooling to precipitate the fine particles; a method where a solution of (a) in a solvent is dispersed in water or an organic solvent; a method of polymerizing a precursor of (a) in water by an emulsion polymerization method, a soap-free emulsion polymerization method, a seed polymerization method, a suspension polymerization method, and the like; and a method where the precursor of (a) is polymerized in an organic solvent by dispersion polymerization and the like].

Among these, from a viewpoint of easiness of producing the fine particles (A), preferable is the production method by a wet process, and more preferable are the precipitation method, the emulsion polymerization method, and the dispersion polymerization.

As the resin (b) in the present invention, there may be used any resin as long as it is a heretofore known resin. There may be used resins similar to the resin (a), and preferable are polyester resins, polyurethane resins, epoxy resins, vinyl resins, and combinations of these.

The Mn, the melting point, the glass transition temperature (hereinafter, abbreviated as Tg), and the SP value of the resin (b) may be suitably adjusted to preferable ranges according to applications.

For example, when the nonaqueous dispersion of resin particles of the present invention is used as a liquid developer which is used for electrophotography, electrostatic recording, electrostatic printing, and the like, the Mn of (b) is preferably 1,000 to 5,000,000, and more preferably 2,000 to 500,000. The melting point of (b) is preferably 20° C. to 300° C., and more preferably 80° C. to 250° C. The Tg of (b) is preferably 20° C. to 200° C., and more preferably 40° C. to 150° C. The SP value of (b) is preferably 8 to 16 $(cal/cm^3)^{1/2}$, and more preferably 9 to 14 $(cal/cm^3)^{1/2}$. The melting point and the Tg in the present invention are the values obtained by DSC measurement or flow tester measurement (when the values cannot be measured by DSC).

In the case of DSC measurement, the measurement is performed by the method specified in ASTM D3418-82 (DSC method) by using "DSC 20" or "SSC/580" (both manufactured by Seiko Electronics, Inc.).

To carry out the flow tester measurement, a Koka-type flow tester, "Model CFT 500" (manufactured by Shimadzu Corporation), is used. Conditions for the flow tester measurement are as follows and, hereinafter, the flow tester measurements are all carried out under these conditions:

<Conditions for Flow Tester Measurement>
Load: 30 $kg/cm^2$;
rate of temperature elevation: 3.0° C./min;
die diameter: 0.50 mm;
die length: 10.0 mm.

The method of calculation of the SP value is according to PolymerEngineering & Science, February, 1974, Vol. 14, No. 2, pp. 147-154.

The method for producing the resin particle (B) containing the resin (b) includes the same production methods as those for the fine particles (A).

The resin particles (C) of the present invention have a core-shell structure wherein the fine particles (A) containing the resin (a) are adhered on the surface of the resin particle (B) containing the resin (b) or a film containing the resin (a) is formed on the surface of the resin particle (B).

The particle diameter of the fine particles (A) is smaller than the particle diameter of the resin particle (B) and, from a viewpoint of particle diameter uniformity, the particle size ratio, [volume average particle diameter of fine particles (A)]/[volume average particle diameter of resin particle (B)], is preferably in a range of 0.001 to 0.3. The lower limit of the particle diameter ratio is more preferably 0.003 and the upper limit is more preferably 0.25. When the particle diameter ratio is more than 0.3, the particle size distribution of the resin particles (C) obtained tends to broaden because (A) does not adhere to the surface of (B) too efficiently.

The volume average particle diameter of the fine particles (A) is suitably adjusted within the above-described range of particle diameter ratio to a particle diameter suitable for obtaining the resin particles (C) of a desired particle diameter.

The volume average particle diameter of (A) is preferably 0.0005 to 30 μm. The upper limit is more preferably 20 μm, and particularly preferably 10 μm; and the lower limit is more preferably 0.01 μm, particularly preferably 0.02 μm, and most preferably 0.04 μm. However, when, for example, the resin particles (C) of a volume average particle diameter of 1 μm are desired, the volume average particle diameter of (A) is preferably 0.0005 to 0.3 μm, and more preferably 0.001 to 0.2 μm. When the resin particles (C) of a volume average particle diameter of 10 μm are desired, the volume average particle diameter of (A) is preferably 0.005 to 3 µm, and more preferably 0.05 to 2 µm. When the resin particles (C) of a volume average particle diameter of 100 µm are desired, the volume average particle diameter of (A) is preferably 0.05 to 30 µm, and more preferably 0.1 to 20 µm.

The volume average particle diameter can be measured by laser type particle size distribution measuring apparatuses, "LA-920" (manufactured by Horiba, Ltd.) and "Multisizer III" (manufactured by Coulter Corp.), an optical type using a laser Doppler method, "ELS-800" (manufactured by Otsuka Electronics Co., Ltd.), and the like. If there was a difference among the values measured by each apparatus, the value measured by "ELS-800" is employed.

Furthermore, because the above-described particle diameter ratio can be obtained easily, the volume average particle diameter of the resin particle (B) is preferably 0.1 to 300 µm, more preferably 0.5 to 250 µm, and particularly preferably 1 to 200 µm.

The weight ratio of the fine particle (A) to the resin particle (B), [(A):(B)], in the present invention is 1:99 to 70:30 and is, from viewpoints of the particle diameter uniformity of the resin particles (C) and storage stability of the nonaqueous dispersion of resin particles, preferably 2:98 to 50:50, and more preferably 3:97 to 35:65. If the weight of (A) is too small, blocking resistance of (C) sometimes deteriorates. Also, if the amount of (B) is too much, the particle diameter uniformity of (C) sometimes deteriorates.

The shape of the resin particles (C) is preferably spherical from viewpoints of flowability, melt leveling property, and the like. In that case, the resin particle (B) are preferably spherical. The average circularity of (C) is preferably 0.96 to 1.0, more preferably 0.97 to 1.0, and particularly preferably 0.98 to 1.0. In addition, the average circularity is a value obtained by optically observing a particle and dividing the circumferential length thereof with the circumferential length of a corresponding circle having the same area as the projected area of the particle. Specifically, the measurement is carried out by using a flow particle image analyzer, "FPIA-2000" (manufactured by Sysmex Corporation). To be specific, 100 to 150 ml of water from which impure solids have been removed beforehand is added to a prescribed container, followed by addition of 0.1 to 0.5 ml of a surfactant, "Drywell" (manufactured by Fuji Photo Film Co., Ltd.), and further addition of about 0.1 to 9.5 g of the measurement sample. The suspension in which the sample is dispersed is subjected to dispersion treatment for 1 to 3 minutes by means of an ultrasonic disperser, "Ultrasonic Cleaner Model VS-150" (manufactured by Welvocria Co., Ltd.) to obtain a dispersion concentration of 3,000 to 10,000 particles/µL. Then, the shape and distribution of the resin particles are measured.

The volume average particle diameter of the resin particles (C) varies depending on the application but is generally preferably 0.01 to 100 µm. The upper limit is more preferably 40 µm, particularly preferably 30 µm, and most preferably 20 µm; the lower limit is more preferably 0.3 µm and particularly preferably 0.5 µm.

Furthermore, from a viewpoint of particle diameter uniformity, the coefficient of variation of volume distribution of the resin particles (C) is preferably 1 to 100%, more preferably 1 to 50%, particularly preferably 1 to 30%, and most preferably 1 to 25%.

The volume average particle diameter, the number average particle diameter, and the variation coefficient of volume distribution of the resin particles (C) can be measured by particle size distribution measuring apparatuses such as a laser scanning particle size distribution analyzer, "LA-920" (manufactured by HORIBA, Ltd.), and the like.

From viewpoints of particle diameter uniformity of the resin particles (C), and fluidity and storage stability of the nonaqueous dispersion of the resin particles, the extent of surface coverage of the resin particle (B), the "core layer," with the fine particles (A), the "shell layer," in the resin particles (C) is preferably 50% or more, and particularly preferably 80% or more. In addition, the term "surface coverage" means that the fine particles (A) are adhered to or forming a film on the surface of the resin particle (B).

The extent of surface coverage of (C) can be obtained by the image analysis of the image obtained by a scanning electron microscope (SEM) based on the following formula:

extent of surface coverage (%)=[(area of the surface covered with the shell layer)/(area of the surface covered with the shell layer+area of the exposed surface of the core layer)]×100.

When used in the liquid electrophotographic developer, the surface of the particles can be provided with desired concavities and convexities by changing the extent of surface coverage of the resin particles (C). From a viewpoint of flowability, the centerline average surface roughness (Ra) of (C) is preferably 0.01 to 0.8 µm. The (Ra) is an arithmetic mean of absolute values of the deviation between the roughness curve and its centerline and can be measured, for example, by a scanning probe microscopic system (manufactured by Toyo Technica Inc).

From viewpoints of the particle size distribution of the resin particles (C), the storage stability of the nonaqueous dispersion of resin particles, and the like, the resin particles (C) preferably comprise, based on the weight of (C), 1 to 70 wt % (more preferably 5 to 50 wt %, and particularly preferably 10 to 35 wt %) of the filmy shell layer and 30 to 99 wt % (more preferably 50 to 95 wt %, and particularly preferably 65 to 90 wt %) of the core layer.

In the shell layer and/or the core layer which constitute the resin particles (C), there may be blended additives (pigments, fillers, antistatic agents, colorants, mold release agents, charge-controlling agents, ultraviolet absorbers, antioxidants, antiblocking agents, heat-resistant stabilizers, flame retardants, and the like).

Furthermore, from a viewpoint of heat-resistant storage stability of the nonaqueous dispersion of resin particles, it is preferable that the resin particle (B), the core layer, contains wax (c) and/or modified wax (d) having vinyl polymer chains grafted thereto as additives.

The content of (c) is preferably 20 wt % or less, and more preferably 1 to 15 wt %. The content of (d) is preferably 10 wt % or less, and more preferably 0.5 to 8 wt %. The total content of (c) and (d) is preferably 25 wt % or less, and more preferably 1 to 20 wt %.

The wax (c) includes synthetic wax (polyolefin wax) and natural wax (paraffin wax, microcrystalline wax, carnauba wax, carbonyl group-containing wax, mixtures of these, and the like). Among these, preferable are paraffin wax (c1) and carnauba wax (c2). As (c1), there may be mentioned petroleum-based wax having a melting point of 50 to 90° C., which comprises as the main component linear saturated hydrocarbons having 20 to 36 carbon atoms; and as (c2), there may be mentioned animal and plant wax having a melting point of 50 to 90° C. and having 16 to 36 carbon atoms.

From a viewpoint of mold releasing characteristics, the Mn of (c) is preferably 400 to 5,000, more preferably 1,000 to 3,000, and particularly preferably, 1,500 to 2,000. Additionally, in the foregoing and in the following, the Mn of the wax (c) is measured by using GPC (solvent: o-dichlorobenzene, standard material: polystyrene).

When (c) and (d) are used in combination, it is preferable that (c) and (d) are dispersed together in the resin (b) after being subjected to a melt-kneading treatment in the absence of a solvent and/or a heat-melting and mixing treatment in the presence of an organic solvent. By this method, (d) is made to coexist in the wax dispersion treatment and, thereby, the wax group portion of (d) becomes adsorbed efficiently on the surface of (c) or becomes partially entangled within the matrix structure of (c). Thus, compatibility of the surface of (c) and the resin (b) becomes better, and (c) can be included in the resin particle (B) more uniformly, resulting in easier control of the state of dispersion.

The modified wax (d) is one obtained by grafting vinyl polymer chains to wax. The wax used in (d) includes the same materials as the above-described wax (c) and preferable ones are also the same. The vinyl monomers which constitute the vinyl polymer chains of (d) include the same materials as the monomers (1) to (10) which constitute the vinyl resins. Among these, preferable are (1), (2), and (6). The vinyl polymer chains may be homopolymers or copolymers of the vinyl monomers.

The amount of wax component in the modified wax (d) (including the unreacted wax) is preferably 0.5 to 99.5 wt %, more preferably 1 to 80 wt %, particularly preferably 5 to 50 wt %, and most preferably 10 to 30 wt %.

The Tg of (d) is, from a viewpoint of heat-resistant storage stability of the nonaqueous dispersion of resin particles, preferably 40 to 90° C., and more preferably 50 to 80° C.

The Mn of (d) is preferably 1,500 to 10,000, and more preferably 1,800 to 9,000. When the Mn is in the range of 1,500 to 10,000, good mechanical strength of the resin particles (C) is obtained.

The modified wax (d) is obtained, for example, as follows: the wax (c) is dissolved or dispersed in a solvent (toluene, xylene, and the like) and the mixture is heated to 100 to 200° C.; thereafter, the vinyl monomers together with a peroxide-type polymerization initiator are added dropwise thereto and, after polymerization, the solvent is distilled off.

In the synthesis of the modified wax(d), the amount of the peroxide-type polymerization initiator is, based on the total weight of raw materials of (d), preferably 0.2 to 10 wt %, and more preferably 0.5 to 5 wt %.

The peroxide-type polymerization initiators include the same materials as those exemplified as the oil-soluble peroxide-type polymerization initiators.

Methods to mix the wax (c) and the modified wax (d) include:
(1) a method to melt-knead at a temperature equal to or higher than the respective melting points;
(2) a method to dissolve or suspend (c) and (d) in the organic solvent (u) and, thereafter, precipitate the wax in the liquid by cooling crystallization, solvent crystallization, and the like, or precipitate the wax in a gas by spray drying and the like;
(3) a method to dissolve or suspend (c) and (d) in the organic solvents (u), followed by mechanical wet milling by means of a disperser; and the like. Among these, the method (2) is preferable.

The method to disperse the wax (c) and the modified wax (d) in (b) includes a method where (c) and (d), and (b) are each made into solutions in solvents or into dispersions, which are, thereafter, mixed with each other; and the like.

The nonaqueous dispersion (X) of resin particles of the present invention is a dispersion where the resin particles (C) are dispersed in a nonhydrophilic organic solvent (L).

The content of (C) in (X) is, from viewpoints of the fixing property and heat-resistant stability, preferably 10 to 50 wt %, more preferably 15 to 45 wt %, and particularly preferably 20 to 40 wt %.

As the nonhydrophilic organic solvent (L), from a viewpoint of dispersion stability of (C), it is necessary to use solvents having a relative permittivity of 1 to 4 at 20° C. For example, the following may be used alone or in combination: hexane, octane, isooctane, decane, isodecane, decalin, nonane, dodecane, isododecane, cyclohexane, cyclooctane, cyclodecane, benzene, toluene, xylene, mesitylene, Isopar E, Isopar G, Isopar H, Isopar L (Isopar: trade name of Exxon Corporation), ShellSol 70, ShellSol 71 (ShellSol: trade name of Shell Oil Co.), Amsco OMS, Amsco 460 (Amsco: trade name of Spirits Co.), silicone oil, liquid paraffin, and the like. Among these, from a viewpoint of odor, preferable are solvents having boiling points of 100° C. or higher, more preferable are hydrocarbon solvents having 10 or more carbon atoms (dodecane, isododecane, liquid paraffin, and the like) and silicone oil, and particularly preferable is liquid paraffin.

The permittivity of (L) is measured by using a bridge method (JIS C2101-1999). Capacitance $C_0$ (pF) when the sample cell is empty before filling with the sample and equivalent parallel capacitance $C_x$ (pF) when the cell is filled with the sample are measured, and the permittivity ϵ is calculated by the following formula (1). The relative permittivity is given by a ratio of this ϵ and the relative permittivity of air, which is 1.000585.

$$\epsilon = C_x/C_0 \qquad (1)$$

Preferably, the solvent contained in the nonaqueous dispersion (X) of resin particles of the present invention comprises substantially only the nonhydrophilic organic solvent (L). However, (X) may comprise other organic solvents in a range of preferably 1 wt % or less, and more preferably 0.5 wt % or less.

The production method of the nonaqueous dispersion (X) of resin particles of the present invention is not particularly limited, but production by the production method of the present invention is preferable because the particle size distribution of the resin particles (C) in (X) becomes narrow.

The production method of the nonaqueous dispersion (X) of resin particles of the present invention comprises mixing a fine particle dispersion (W) comprising fine particles (A) that contain a resin (a) dispersed in a nonhydrophilic organic solvent (L) that exhibits a relative permittivity of 1 to 4 at 20° C., and a resin solution (O1) having a resin (b) dissolved in an organic solvent (M) having a solubility parameter of 8.5 to 20 $(cal/cm^3)^{1/2}$ or a resin solution (O2) having a precursor (b0) of the resin (b) dissolved in (M); dispersing (O1) or (O2) in (W) and, when (O2) is used, reacting (b0) further to form a resin particle (B) containing (b) in (W), thereby to obtain a nonaqueous dispersion (X') of resin particles (C) having a structure wherein the fine particles (A) are adhered to the surface of the resin particle (B); and further distilling off (M) from (X').

Preferable characteristics of the fine particles (A) include that, at a temperature of dispersion, they have enough strength not to be broken by shear, that they do not easily dissolve in or swell with the nonhydrophilic organic solvent (L) which is the dispersion medium, and that they do not easily dissolve in (O1) or (O2).

In addition, (b) and (b0) may be used in combination as a mixed solution.

From a viewpoint of decreasing dissolution and swelling of the fine particles (A) in the nonhydrophilic solvent (L) which is used for dispersion, it is preferable to suitably adjust the molecular weight, SP value, crystallinity, molecular weight between crosslinking points, and the like of the resin (a).

The production method of the fine particle dispersion (W) in which fine particles (A) are dispersed in the nonhydrophilic solvent (L) is not particularly limited, but may include the following (1) to (6):

(1) in the case of vinyl resins, a method of directly producing a dispersion of fine particles (A) by a polymerization reaction such as a dispersion polymerization method and the like in a solvent containing (L) using monomers as the starting materials, and, if necessary, distilling off solvents other than (L) [when distilling off the solvents other than (L), a portion of (L) (low-boiling component) may be distilled off. The same shall apply in the following processes of distilling off the solvents];

(2) in the case of polyaddition- or polycondensation-type resins such as a polyester resin, a polyurethane resin, or the like, a method of dispersing precursors (monomers, oligomers, and the like) or solvent solutions thereof in (L), if necessary, in the presence of a suitable dispersing agent, thereafter curing the precursors by heating or by adding curing agents, and, if necessary, by distilling off solvents other than (L) to produce a fine particle dispersion of (A);

(3) in the case of polyaddition- or polycondensation-type resins such as polyester resins, polyurethane resins, or the like, a method of dissolving a suitable emulsifying agent in precursors (monomers, oligomers, and the like) or solvent solutions thereof (the solutions being preferably liquid; may be liquefied by heating), thereafter, reprecipitating the precursors by addition of (L) which functions as a poor solvent, curing the precursors by addition of curing agents and the like, and, if necessary, distilling off solvents other than (L) to produce a fine particle dispersion of (A);

(4) a method of pulverizing a resin prepared beforehand by a polymerization reaction (any type of polymerization reaction including addition polymerization, ring-opening polymerization, polyaddition, addition-condensation, condensation polymerization, and the like. Hereinafter the same shall apply) by using a pulverizing mill such as a mechanical rotating type or a jet type, subsequently obtaining resin particles by sifting, and, thereafter dispersing the particles in (L) in the presence of a suitable dispersing agent;

(5) a method of spraying in a mist form a resin solution (may be a resin polymerized in a solvent) of a resin dissolved in a solvent, the resin having been prepared beforehand by a polymerization reaction to obtain resin particles and, thereafter, dispersing the resin particles in (L) in the presence of a suitable dispersing agent; and (6) a method of precipitating resin particles in the presence of a suitable dispersing agent by addition of a poor solvents [being preferably (L)] to a solution of a resin dissolved in a solvent, the resin having been prepared beforehand by polymerization reactions (may be a resin polymerized in a solvent) or by cooling a solution obtained beforehand by dissolving a resin in a solvent under heat, and, if necessary, distilling off solvents other than (L).

Among these methods, preferable are the methods (1) and (6), and more preferable is the method (6).

The dispersing agent used in the above-described methods (1) to (6) include heretofore known surfactants (s), oil-soluble polymers (t), and the like. Furthermore, organic solvents (u), plasticizers (v), and the like may be used in combination as an auxiliary agent for dispersion.

The surfactants (s) include anionic surfactants (s-1), cationic surfactants (s-2), amphoteric surfactants (s-3), nonionic surfactants (s-4), and the like. Further, the surfactants may be used in a combination of two or more.

The anionic surfactants (s-1) include ether carboxylic acids (or salts thereof) having alkyl groups having 8 to 24 carbon atoms [sodium (poly)oxyethylene (number of repeating units: 1 to 100) lauryl ether acetate and the like], ether sulfate salts having alkyl groups having 8 to 24 carbon atoms [sodium (poly)oxyethylene (number of repeating units: 1 to 100) lauryl sulfate and the like], sulfosuccinate salts having alkyl groups having 8 to 24 carbon atoms [di- or mono-sodium mono- or di-alkyl sulfosuccinate, di- or mono-sodium (poly) oxyethylene (number of repeating units: 1 to 100) mono- or di-alkyl sulfosuccinate, and the like], (poly)oxyethylene (number of repeating units: 1 to 100) coconut fatty acid monoethanolamide sulfuric acid sodium salt, sulfonic acid salts having alkyl groups having 8 to 24 carbon atoms (sodium dodecylbenzenesulfonate and the like), phosphoric acid ester salts having alkyl groups having 8 to 24 carbon atoms [sodium lauryl phosphate, sodium (poly)oxyethylene (number of repeating units: 1 to 100) lauryl ether phosphate, and the like], fatty acid salts (sodium laurate, triethanolammonium laurate, and the like), acylated amino acid salts (sodium coconut oil fatty acid methyl taurate and the like), and the like.

The cationic surfactants (s-2) include quaternary ammonium salt-type and amine salt-type cationic surfactants and the like. As the quaternary ammonium salt-type cationic surfactants, there may be used compounds obtained by the reaction of tertiary amines and quaternization agents (halogenated alkyls such as methyl chloride, methyl bromide, ethyl chloride, benzyl chloride, and the like; dimethyl sulfate, dimethyl carbonate, ethylene oxide, and the like), and the like. The examples include didecyldimethylammonium chloride, stearyltrimethylammonium bromide, lauryldimethylbenzylammonium chloride (benzalkonium chloride), polyoxyethylenetrimethylammonium chloride, stearamideethyldiethylmethyl ammonium methosulfate, and the like. As the amine salt-type cationic surfactants, there may be used compounds obtained by neutralizing primary to tertiary amines with inorganic acids (hydrochloric acid, nitric acid, sulfuric acid, hydroiodic acid, and the like) or organic acids (acetic acid, formic acid, oxalic acid, lactic acid, gluconic acid, adipic acid, alkyl phosphoric acid, and the like). The primary amine salt-type includes inorganic acid salts or organic acid salts of higher aliphatic amines (higher amines such as lauryl amine, stearyl amine, hardened tallow amine, rosin amine, and the like), salts of lower amines with higher fatty acids (stearic acid, oleic acid, and the like), and the like. The secondary amine salt-type includes inorganic acid salts or organic acid salts of ethylene oxide adducts of aliphatic amines and the like.

The amphoteric surfactants (s-3) include carboxybetaine-type amphoteric surfactants [fatty acid (having 10 to 18 carbon atoms) amide propyl dimethylamino acetic acid betaine (coconut oil fatty acid amide propyl betaine and the like), alkyl (having 10 to 18 carbon atoms) dimethylamino acetic acid betaine (lauryldimethylamino acetic acid betaine and the like), imidazolinium-type carboxy betaine (2-alkyl-N-carboxymethyl-N-hydroxyethylimidazolinium betaine and the like)], sulfobetaine-type amphoteric surfactants [fatty acid (having 10 to 18 carbon atoms) amide propyl hydroxyethyl sulfobetaine (coconut oil fatty acid amide propyldimethyl hydroxyethyl sulfobetaine and the like), dimethylalkyl (having 10 to 18 carbon atoms) dimethyl hydroxyethyl sulfobetaine (lauryl hydroxy sulfobetaine and the like)], amino acid-type amphoteric surfactants (sodium β-laurylaminopropionate and the like].

The nonionic surfactants (s-4) include AO adduct-type nonionic surfactants, polyhydric alcohol-type nonionic surfactants, and the like.

The AO adduct-type nonionic surfactants include AO (having 2 to 4 carbon atoms, preferably 2) adducts (number of moles added per active hydrogen: 1 to 30) of higher alcohols (having 8 to 18 carbon atoms); EO adducts (number of moles added: 1 to 30) of alkyl (having 1 to 12 carbon atoms) phenol; AO (having 2 to 4 carbon atoms, preferably 2) adducts (number of moles added per active hydrogen: 1 to 40) of higher amines (having 8 to 22 carbon atoms); EO adducts (number of moles added per active hydrogen: 1 to 60) of fatty acids (having 8 to 18 carbon atoms); EO adducts (number of moles added per active hydrogen: 1 to 50) of polypropylene glycols (Mn=200~4,000); polyoxyethylene (number of repeating units: 3 to 30) alkyl (having 6 to 20 carbon atoms) allyl ether, EO adducts (number of moles added per active hydrogen: 1 to 30) of aliphatic acid (having 8 to 24 carbon atoms) esters of polyhydric (2- to 8- or more-hydric) alcohols (having 2 to 30 carbon atoms) such as EO adducts (number of moles added per active hydrogen: 1 to 30) of sorbitan monolaurate, EO adducts (number of moles added per active hydrogen: 1 to 30) of sorbitan monooleate, and the like; and the like.

The polyhydric alcohol-type nonionic surfactants include fatty acid (having 8 to 24 carbon atoms) esters of polyhydric (2- to 8- or more-hydric) alcohols (2 to 30 carbon atoms) such as glycerin monooleate, sorbitan monolaurate, sorbitan monooleate, and the like; fatty acid (having 10 to 18 carbon atoms) alkanolamides such as lauric acid monoethanolamide, lauric acid diethanolamide, and the like; and the like.

The oil-soluble polymers (t) include, for example, polymers containing at least one group selected from an alkyl group having 4 or more carbon atoms, a dimethylsiloxane group, or a functional group containing fluorine atoms. Further, the polymer preferably contains an alkyl group, a dimethylsiloxane group, or a functional group containing fluorine atoms, which has compatibility with the nonhydrophilic organic solvent (L), and, at the same time, preferably contains a chemical structure which is compatible with the resin (b).

Specifically, preferable are copolymers of, among the vinyl monomers, monomers containing alkyl groups having 4 or more carbon atoms, monomers (or reactive oligomers) containing dimethylsiloxane groups, and/or monomers containing fluorine atoms with the vinyl monomers which constitute the resin (b). While the mode of copolymerization may be any of random, block, and graft, preferable is block or graft.

The organic solvents (u) used to obtain the fine particle dispersion (W) of the fine particles (A) include the nonhydrophilic organic solvents (L) and organic solvents other than (L) [specific examples include the after-mentioned organic solvents (M) except those which correspond to (L), and the like]. Because the solvents other than (L) need to be distilled off when the fine particle dispersion (W) is prepared, they are preferably those which have lower boiling points than (L) used as the dispersion medium of (W) and which can be easily distilled off.

The plasticizers (v) may be added as necessary at the time of dispersion to either (L) or to the material to be dispersed [the resin solution (O1) or (O2) in an organic solvent (M) containing the resin (b) or (b0), respectively].

The plasticizers (v) are not particularly limited and include the following:

(v1) phthalic acid esters (dibutyl phthalate, dioctyl phthalate, butylbenzyl phthalate, diisodecyl phthalate, and the like);

(v2) aliphatic dibasic acid esters [di(2-ethylhexyl) adipate, di(2-ethylhexyl) sebacate, and the like];

(v3) trimellitic acid esters [tri(2-ethylhexyl) trimellitate, trioctyl trimellitate, and the like];

(v4) phosphoric acid esters [triethyl phosphate, tri(2-ethylhexyl) phosphate, tricresyl phosphate, and the like];

(v5) fatty acid esters (butyl oleate and the like); and (v6) mixtures of two or more of these.

The nonaqueous dispersion (X') of resin particles (C) having a structure of the fine particles (A) adhered to the surface of the resin particle (B) is obtained by mixing the above-described fine particle dispersion (W) and a resin solution (O1) having a resin (b) dissolved in an organic solvent (M) having a solubility parameter of 8.5 to 20 $(cal/cm^3)^{1/2}$ or a resin solution (O2) containing a precursor (b0) of the resin (b) dissolved in (M); dispersing (O1) or (O2) in (W) and, when (O2) is used, reacting (b0) further to form the resin particle (B) containing (b) in (W).

When dispersing (O1) or (O2), there may be used a dispersing apparatus.

The dispersing apparatus used in the present invention is not particularly limited as long as it is one which is generally commercially available as an emulsifier or a disperser. Examples include batch-type emulsifiers such as a homogenizer (manufactured by IKA Japan K.K.), Polytron (manufactured by Kinematica AG), and TK Auto Homomixer (manufactured by Tokushu Kika Kogyo Co., Ltd.); continuous emulsifiers such as Ebara Milder (manufactured by Ebara Corporation), TK Fillmix and TK Pipe Line Homomixer (manufactured by Tokushu Kika Kogyo Co., Ltd.), Colloid Mill (manufactured by Shinko Pantech Co., Ltd.), a slasher and Trigonal wet pulverizer (manufactured by Mitsui Miike Machinery Co., Ltd.), Capitron (manufactured by Eurotech, Ltd.), and Fine Flow Mill (manufactured by Pacific Machinery & Engineering Co., Ltd.); high-pressure emulsifiers such as Microfluidizer (manufactured by Mizuho Kogyo Co., Ltd.), Nanomizer (manufactured by Nanomizer Inc.), and APV Gaulin (manufactured by Gaulin Co., Ltd.); membrane emulsifiers such as a membrane emulsifier (manufactured by REICA Co., Ltd.) and the like; vibration emulsifiers such as Vibro Mixer (manufactured by REICA Co., Ltd.) and the like; ultrasonic emulsifiers such as an ultrasonic homogenizer (manufactured by BRANSON Co. Ltd.); and the like. Among these, from a viewpoint of uniformization of the particle diameter, preferable are APV Gaulin, the homogenizer, TK Auto Homomixer, Ebara Milder, TK Fillmix, and TK Pipe Line Homomixer.

The viscosity of (O1) or (O2) is, from a viewpoint of particle diameter uniformity, preferably 10 to 50,000 mPa·s (as measured by a B type viscometer), and more preferably 100 to 10,000 mPa·s.

The temperature during dispersion is preferably 0 to 150° C. (under pressure), and more preferably 5 to 98° C. When the viscosity of the nonaqueous dispersion (X') of resin particles is high, it is preferable to carry out dispersion with the viscosity reduced to the above-described preferable range by raising the temperature.

While the organic solvent (M) used for the solvent solution of the resin (b) or the precursor (b0) may be any solvent as long as it can dissolve the resin (b) at an ordinary temperature or under heating, the SP value thereof is preferably 8.5 to 20 $(cal/cm^3)^{1/2}$, and more preferably 10 to 19 $(cal/cm^3)^{1/2}$. When a mixed solvent is used as (M), assuming additivity for the SP values, it suffices if a weighted average calculated from the SP values of the respective solvents is in the above-described range. If the SP value is outside the above-described range, solubility of (b) or (b0) sometimes become insufficient.

As the organic solvent (M), there may be suitably selected one which has an SP value within the above-described range and which is suited for a combination with the resin (b) or the precursor (b0) of the resin (b). Examples include aromatic hydrocarbon-type solvents such as toluene, xylene, ethylbenzene, tetralin, and the like; aliphatic or alicyclic hydrocarbon-type solvents such as n-hexane, n-heptane, mineral spirits, cyclohexane, and the like; halogenated solvents such as methyl chloride, methyl bromide, methyl iodide, methylene dichloride, carbon tetrachloride, trichloroethylene, perchloroethylene, and the like; ester-type or ester-ether-type solvents such as ethyl acetate, butyl acetate, methoxybutyl acetate, methyl cellosolve acetate, ethyl cellosolve acetate, and the like; ether-type solvents such as diethyl ether, THF, dioxane, ethyl cellosolve, butyl cellosolve, propylene glycol monomethyl ether, and the like; ketone-type solvents such as acetone, methyl ethyl ketone, methyl isobutyl ketone, di-n-butyl ketone, cyclohexanone, and the like; alcohol-type solvents such as methanol, ethanol, n-propanol, isopropanol, n-butanol, isobutanol, t-butanol, 2-ethylhexyl alcohol, benzyl alcohol, and the like; amide-type solvents such as dimethylformamide, dimethylacetamide, and the like; sulfoxide-type solvents such as dimethyl sulfoxide and the like; heterocyclic compound-type solvents such as N-methylpyrrolidone and the like; and mixed solvents of two or more of these.

The boiling point of (M) is, from viewpoints of odor and easiness of distilling off from the nonaqueous dispersion (X') of resin particles, preferably 100° C. or less, and more preferably 90° C. or less.

When a polyester resin, a polyurethane resin, or an epoxy resin is selected as the resin (b), the preferable organic solvent (M) includes acetone, dimethylformamide, dimethyl sulfoxide, N-methylpyrrolidone, and mixed solvents of two or more of these.

The method to dissolve the resin (b) or the precursor (b0) of the resin (b) in the organic solvent (M) may be any and heretofore known methods can be used. For example, there may be mentioned a method of adding the resin (b) or its precursor (b0) to the organic solvent (M) and stirring the mixture, and a method of heating the same mixture, and the like.

The precursor (b0) of the resin (b) is not particularly limited as long as it can be converted to the resin (b) by a chemical reaction. When the resin (b) is a condensation-type resin (for example, a polyurethane resin, an epoxy resin, a polyester resin, and the like), (b0) includes a combination of a prepolymer ($\alpha$) having reactive groups and a curing agent ($\beta$); and when the resin (b) is a vinyl resin, (b0) includes the above-described vinyl monomers (may be used alone or in a combination of two or more) and a solvent solution thereof.

When the vinyl monomers are used as the precursor (b0), the method of reacting the precursor (b0) to form the resin (b) includes, for example, a method (the so-called suspension polymerization) of dispersing and suspending an oil phase comprising an oil-soluble initiator, the monomers, and the organic solvent (M) in the nonhydrophilic organic solvent (L) in the presence of an oil-soluble polymer (t) and subjecting the system to a radical polymerization reaction by heating; a method (the so-called dispersion polymerization) of emulsifying an oil phase comprising the monomers and the organic solvent (M) in a fine particle dispersion (W) of the fine particles (A), which contains a dispersant [including the same materials as the surfactants (s)] and an oil-soluble initiator, and subjecting the system to a radical polymerization reaction by heating; and the like.

The above-described oil-soluble initiators include oil-soluble peroxide-type polymerization initiators (I), oil-soluble azo-type polymerization initiators (II), and the like. Furthermore, the oil-soluble peroxide-type polymerization initiators (I) and reducing agents may be used in combination to form redox-type polymerization initiators (III). Further, from among (I) to (III), two or more may be used in combination.

Oil-soluble peroxide-type polymerization initiators (I):
included are acetyl peroxide, t-butyl peroxy-2-ethylhexanoate, benzoyl peroxide, p-chlorobenzoyl peroxide, cumene peroxide, and the like.

Oil-soluble azo-type polymerization initiators (II):
included are 2,2'-azobisisobutyronitrile, 2,2'-azobis(2,4-dimethylvaleronitrile), dimethyl 2,2'-azobis(2-methylpropionate), 2,2'-azobis(4-methoxy-2,4-dimethylvaleronitrile), and the like.

Nonaqueous redox-type polymerization initiators (III):
included are combinations of oil-soluble peroxides such as hydroperoxides, dialkyl peroxides, diacyl peroxide, and the like, and oil-soluble reducing agents such as tertiary amines, naphthenic acid salts, mercaptans, organometallic compounds (triethylaluminum, triethylboron, diethylzinc, and the like), and the like.

As the precursor (b0), there may also be used a combination of a prepolymer ($\alpha$) having reactive groups and a curing agent ($\beta$). Here, the term "reactive group" refers to a group which can react with the curing agent ($\beta$). In this case, methods to react the precursor (b0) to form the resin (b) include a method of dispersing a solvent solution containing the prepolymer ($\alpha$) having reactive groups, the curing agent ($\beta$), and the organic solvent (M) in the fine particle dispersion (W) of the fine particles (A) and reacting the prepolymer ($\alpha$) having reactive groups and the curing agent ($\beta$) by heating to form the resin particle (B) containing the resin (b); and a method of dispersing a solvent solution of the prepolymer ($\alpha$) having reactive groups in the fine particle dispersion (W) of the fine particles (A), adding the oil-soluble curing agent ($\beta$) hereto, and carrying out a reaction to form the resin particle (B) containing the resin (b); and the like.

Combinations of the reactive groups possessed by the reactive group-containing prepolymer ($\alpha$) and the curing agent ($\beta$) include the following (1), (2), and the like:

(1) a combination where the reactive groups possessed by the reactive group-containing prepolymer ($\alpha$) are functional groups ($\alpha$1) which can react with active hydrogen compounds and the curing agent ($\beta$) is an active hydrogen group-containing compound ($\beta$1); and (2) a combination where the reactive groups possessed by the reactive group-containing prepolymer ($\alpha$) are active hydrogen-containing groups ($\alpha$2) and the curing agent ($\beta$) is a compound ($\beta$2) which can react with the active hydrogen-containing groups.

Among these, (1) is preferable from a viewpoint of the extent of the reaction.

In the above-described combination (1), the functional groups ($\alpha$1) which can react with active hydrogen compounds include an isocyanate group ($\alpha$1a), a blocked isocyanate group ($\alpha$1b), an epoxy group ($\alpha$1c), an acid anhydride group ($\alpha$1d), an acid halide group ($\alpha$1e), and the like. Preferable among these are ($\alpha$1a), ($\alpha$1b), and ($\alpha$1c), and more preferable are ($\alpha$1a) and ($\alpha$1b).

Here, the blocked isocyanate group ($\alpha$1b) refers to an isocyanate group which is blocked with a blocking agent.

The above-described blocking agent includes oximes (acetoxime, methyl isobutyl ketoxime, diethyl ketoxime, methyl ethyl ketoxime, and the like); lactams ($\gamma$-butyrolactam, $\epsilon$-caprolactam, $\gamma$-valerolactam, and the like); aliphatic alcohols having 1 to 20 carbon atoms (ethanol, methanol, octanol, and the like); phenols (phenol, m-cresol, xylenol, nonylphenol, and the like); active methylene compounds (acetylacetone, ethyl malonate, ethyl acetoacetate, and the like); basic nitrogen-containing compounds (N,N-diethylhydroxylamine, 2-hydroxypyridine, pyridine-N-oxide, 2-mercaptopyridine, and the like); and mixtures of two or more of these.

Preferable among these are oximes, and more preferable is methyl ethyl ketoxime.

The skeleton of the reactive group-containing prepolymer (α) includes polyether (αw), polyester (αx), epoxy resin (αy), polyurethane (αz), and the like. Preferable among these are (αx), (αy), and (αz), and more preferable are (αx) and (αz).

The polyether (αw) includes polyethylene oxide, polypropylene oxide, polybutylene oxide, polytetramethylene oxide, and the like.

The polyester (αx) includes polycondensation products of diols (11) and dicarboxylic acids (13), polylactones (ring-opening polymerization products of ε-caprolactone), and the like.

The epoxy resin (αy) includes addition condensation products of bisphenols (bisphenol A, bisphenol F, bisphenol S, and the like) and epichlorohydrin, and the like.

The polyurethane (αz) includes polyaddition products of diols (11) and polyisocyanates (15), polyaddition products of polyesters (αx) and polyisocyanates (15), and the like.

Methods to introduce reactive groups into the polyester (αx), the epoxy resin (αy), the polyurethane (αz), and the like include:

(1) a method to make functional groups of a constituent component remain at the terminals by using one of two or more constituent components in excess;

(2) a method to make functional groups of a constituent component remain at the terminals by using one of two or more constituent components in excess and, further, to react a compound having functional groups and reactive groups which can react with the remaining functional groups; and the like.

According to the above-described method (1), there may be obtained hydroxyl group-containing polyester prepolymers, carboxyl group-containing polyester prepolymers, acid halide group-containing polyester prepolymers, hydroxyl group-containing epoxy resin prepolymers, epoxy group-containing epoxy resin prepolymers, hydroxyl group-containing polyurethane prepolymers, isocyanate group-containing polyurethane prepolymers, and the like.

With regard to the ratio of the constituent components, for example, in the case of a hydroxyl group-containing prepolymer, the ratio of the polyol (1) to polycarboxylic acid (2) is, as an equivalent ratio of the hydroxyl group [OH] to the carboxyl group [COOH], i.e., [OH]/[COOH], preferably 2/1 to 1.01/1, more preferably 1.5/1 to 1.01/1, and particularly preferably 1.3/1 to 1.02/1. In the case of prepolymers containing other skeletons and terminal groups, also, the ratio remains the same with only the constituent components being replaced.

According to the above-described method (2), isocyanate group-containing prepolymers, blocked isocyanate group-containing prepolymers, epoxy group-containing prepolymers, and acid anhydride group-containing prepolymers are obtained by reacting polyisocyantes, blocked polyisocyanates, polyepoxides, and polyacid anhydrides, respectively, with prepolymers obtained by the above-described method (1).

With regards to the amount of use of the compound having functional groups and reactive groups is, for example, when a polyisocyanate is reacted with a hydroxyl group-containing polyester to obtain an isocyanate group-containing polyester prepolymer, the proportion of the polyisocyanate is, as an equivalent ratio of the isocyanate group [NCO] and the hydroxyl group [OH] of the hydroxyl group-containing polyester, i.e., [NCO]/[OH], preferably 5/1 to 1.01/1, more preferably 4/1 to 1.2/1, and particularly preferably 2.5/1 to 1.5/1. In the case of prepolymers having other skeletons and terminal groups also, the ratio remains the same with only the constituent components being replaced.

The number of the reactive groups contained per molecule of the reactive group-containing prepolymer (α) is preferably 1 or more, more preferably on average 1.5 to 3, and particularly preferably on average 1.8 to 2.5. Within the above-described range, the cured material obtained by reacting the prepolymer (α) with the curing agent (β) exhibits higher Mn and Mw.

The Mn of the reactive group-containing prepolymer (α) is preferably 500 to 30,000, more preferably 1,000 to 20,000, and particularly preferably 2,000 to 10,000.

The Mw of the reactive group-containing prepolymer (α) is preferably 1,000 to 50,000, more preferably 2,000 to 40,000, and particularly preferably 4,000 to 20,000.

The viscosity of the reactive group-containing prepolymer (α) is, at 100° C., preferably 2,000 poise or less, and more preferably 1,000 poise or less. It is preferable to keep the viscosity at 2,000 poise or less in that resin particles (D) and (C) having a sharp particle size distribution are obtained.

The active hydrogen group-containing compound (β1) includes a polyamine (β1a) which may be blocked with a compound which can be eliminated, a polyol (β1b), a polymercaptan (β1c), water, and the like. Preferable among these are (β1a), (β1b), and water, more preferable are (β1a) and water, and particularly preferable are blocked polyamines and water.

As (β1a), there may be mentioned the same compounds as the polyamines (16). Preferable among (β1a) are 4,4'-diaminodiphenylmethane, xylylenediamine, isophoronediamine, ethylenediamine, diethylenetriamine, triethylenetetramine, and mixtures of these.

When (β1a) is a polyamine blocked with a compound which can be eliminated, the specific examples include ketimine compounds obtained from the above-described polyamines and ketones having 3 to 8 carbon atoms (acetone, methyl ethyl ketone, methyl isobutyl ketone, and the like); aldimine compounds obtained from the polyamines and aldehyde compounds having 2 to 8 carbon atoms (formaldehyde, acetaldehyde, and the like); enamine compounds; oxazolidine compounds; and the like.

The polyol (β1b) includes the same compounds as the above-described diols (11) and the 3- to 8- or more-hydric polyols (12). Preferable among (β1b) are the diols (11) used alone and mixtures of the diols (11) and small amounts of the polyols (12).

The polymercaptan (β1c) includes ethylenedithiol, 1,4-butanedithiol, 1,6-hexanedithiol, and the like.

The active hydrogen group-containing compound (β1) may, if necessary, be used in combination with a reaction stopper (βs). By using the reaction stopper in combination with (β1) in a certain ratio, it becomes possible to adjust the molecular weight of (b) to a prescribed value.

The reaction stopper (βs) includes:

monoamines (diethylamine, monoethanolamine, diethanolamine, and the like);

monoamines which are blocked (ketimine compounds and the like);

monools (methanol, ethanol, phenol, and the like);

monomercaptans (butylmercaptan, laurylmercaptan, and the like);

monoisocyanates (lauryl isocyanate, phenyl isocyanate, and the like);

monoepoxides (butyl glycidyl ether, and the like); and the like.

In the above-described combination (2), the active hydrogen group ($\alpha 2$) possessed by the reactive group-containing prepolymer ($\alpha$) includes an amino group ($\alpha 2a$), a hydroxyl group (an alcoholic hydroxyl group and a phenolic hydroxyl group) ($\alpha 2b$), a mercapto group ($\alpha 2c$), a carboxyl group ($\alpha 2d$), and an organic group ($\alpha 2e$) obtained by blocking these with compounds which can be eliminated, and the like. Preferable among these are ($\alpha 2a$), ($\alpha 2b$), and an organic group ($\alpha 2e$) which is an amino group blocked with a compound which can be eliminated, and more preferable is ($\alpha 2b$).

The organic group which is an amino group blocked with a compound which can be eliminated includes the same groups as ($\beta 1a$).

The compound ($\beta 2$) which can react with the active hydrogen-containing groups includes a polyisocyanate ($\beta 2a$), a polyepoxide ($\beta 2b$), a polycarboxylic acid ($\beta 2c$), a polycarboxylic acid anhydride ($\beta 2d$), a poly-acid halide ($\beta 2e$), and the like. Preferable among these are ($\beta 2a$) and ($\beta 2b$), and more preferable is ($\beta 2a$).

The polyisocyanate ($\beta 2a$) includes the same compounds as the polyisocyanates (15) and the preferable ones are also the same.

The polyepoxide ($\beta 2b$) includes the same compounds as the polyepoxides (19) and the preferable ones are also the same.

The polycarboxylic acid ($\beta 2c$) includes a dicarboxylic acid ($\beta 2c$-1) and 3- or more-basic polycarboxylic acid ($\beta 2c$-2). Preferable are ($\beta 2c$-1) used alone and a mixture of ($\beta 2c$-1) and a small amount of ($\beta 2c$-2).

The dicarboxylic acid ($\beta 2c$-1) includes the same compounds as the dicarboxylic acids (13) and the preferable ones are also the same.

The polycarboxylic acid ($\beta 2c$-2) includes the same compounds as the 3- to 6- or more-basic polycarboxylic acids (14) and the preferable ones are also the same.

The polycarboxylic acid anhydride ($\beta 2d$) includes pyromellitic acid anhydride and the like.

The poly-acid halide ($\beta 2e$) includes the acid halides of ($\beta 2c$) (acid chlorides, acid bromides, acid iodides, and the like) and the like.

Furthermore, if necessary, the reaction stopper ($\beta s$) may be used in combination with ($\beta 2$).

The proportion of the curing agent ($\beta$) is, as a ratio of the equivalent [$\alpha$] of the reactive group in the reactive group-containing prepolymer ($\alpha$) and the equivalent [$\beta$] of the active hydrogen-containing group in the curing agent ($\beta$), i.e., [$\alpha$]/[$\beta$], preferably 1/2 to 2/1, more preferably 1.5/1 to 1/1.5, and particularly preferably 1.2/1 to 1/1.2. In addition, when the curing agent ($\beta$) is water, the water is treated as a difunctional active hydrogen compound.

The resin (b) obtained by reacting the precursor (b0) in a nonaqueous medium, the precursor (b0) comprising the reactive group-containing prepolymer ($\alpha$) and the curing agent ($\beta$), becomes the constituent component of the resin particle (B) and the resin particles (C). The Mw of the resin (b) obtained by reacting the reactive group-containing prepolymer ($\alpha$) and the curing agent ($\beta$) is preferably 3,000 or more, more preferably 3,000 to 10,000,000, and particularly preferably 5,000 to 1,000,000.

At the time of reaction of the reactive group-containing prepolymer ($\alpha$) and the curing agent ($\beta$) in a nonaqueous medium, there may be included in the system a polymer (the so-called dead polymer) which does not react with the reactive group-containing prepolymer ($\alpha$) and the curing agent ($\beta$). In this case, the resin (b) corresponds to the mixture of the resin obtained by reacting the reactive group-containing prepolymer ($\alpha$) and the curing agent ($\beta$) in a nonaqueous medium, and the unreacted resin (the dead polymer).

The amount of use of the fine particle dispersion (W) per 100 parts by weight of the resin (b) or the precursor (b0) is preferably 50 to 2,000 parts by weight, and more preferably 100 to 1,000 parts by weight. If the amount is 50 parts by weight or more, the dispersed state of the resin (b) becomes good and if the amount is 2,000 parts by weight or less, the final product becomes economical.

By having resin particle (B) containing (b) formed in (W), there is obtained the nonaqueous dispersion (X') of resin particles which have a structure of fine particles (A) adhered to the surface of a resin particle (B).

Adsorption force of (A) for the resin particle (B), which enables the fine particles (A) to adhere to the surface of the resin particle (B), can be controlled by the following methods:

(1) when producing the nonaqueous dispersion (X') of resin particles, if (A) and (B) are so designed that they have opposite charges (positive and negative), adsorption force is generated between them. In this case, as the respective charges of (A) and (B) are increased, the adsorption force between them becomes stronger and the extent of coverage of (B) with (A) becomes greater;

(2) when producing the nonaqueous dispersion of resin particles (X'), if (A) and (B) are designed so that they have homopolar charges (both having positive charges or negative charges), the extent of coverage tends to drop. In this case, generally, if the surfactants (s) and/or oil-soluble polymers (t) [particularly those which have charges opposite to (A) and (B)] are used, the adsorption force becomes stronger and the extent of coverage increases;

(3) when the difference in the SP values of the resin (a) and the resin (b) is decreased, the adsorption force becomes stronger and the extent of coverage becomes greater.

In the production method of the nonaqueous dispersion (X) of resin particles of the present invention, after obtaining a nonaqueous dispersion (X') of the resin particles (C) having a structure of the fine particles (A) adhered to the surface of the resin particle (B), the organic solvent (M) is distilled off from the nonaqueous dispersion (X') of resin particles to obtain the nonaqueous dispersion (X) of resin particles of the present invention. Here, in order to maintain the structure of the fine particles (A) adhered to the surface of the resin particle (B), it is necessary to choose, as (M), a solvent which dissolves (B) but does not dissolve (A).

In order to form a structure where the fine particles (A) form a film on the surface of the resin particle (B), it is necessary that (A) which adhered to the surface of (B) is dissolved in (M) when distilling (M) off and (A) forms a film on the surface of the core layer constituted by (B). Thus, as (M), it is necessary to choose a solvent which dissolves both (A) and (B).

From a viewpoint of film formation, preferable among (M) are THF, toluene, acetone, methyl ethyl ketone, and ethyl acetate, and more preferable are acetone and ethyl acetate.

Particularly, by using (M) in an amount of preferably 10 to 50 wt % (more preferably 20 to 40 wt %) in (X') and distilling (M) off at 40° C. or less until the content of (M) becomes 1 wt % or less (more preferably 0.5 wt % or less), the fine particles (A) are dissolved in the solvent and form a film, resulting in formation of a filmy shell layer on the surface of the core layer constituted by the resin particle (B).

The solvent used when the fine particles (A) are dissolved in a solvent and formed into a film may be added to (X') at the time of film formation. However, it is more preferable to use the organic solvent (M), which is used in the solvent solution of the resin (b) or the precursor (b0) as a raw material when obtaining (X'), without removing it immediately after formation of the resin particle (B), because the solvent contained in (B) makes dissolution of (A) easier and aggregation of particles more difficult to occur.

When dissolving (A) in a solvent, the concentration of the organic solvent (M) in the nonaqueous dispersion (X') of resin particles is preferably 3 to 50 wt %, more preferably 10 to 40 wt %, and particularly preferably 15 to 30 wt %. Furthermore, dissolution is carried out, for example, by stirring the nonaqueous dispersion (X') of resin particles for 1 to 10 hours. The temperature during dissolution is preferably 15 to 45° C., and more preferably 15 to 30° C.

When (A) is melted to form a film on the surface of (B), the solid content (content of components other than the solvent) of the nonaqueous dispersion (X') of resin particles is adjusted to preferably 1 to 50 wt %, and more preferably 5 to 30 wt %. Furthermore, the content of the organic solvent (M) at this time is preferably 2 wt % or less, more preferably 1 wt % or less, and particularly preferably 0.5 wt % or less. When the solid content of (X') is high or when the content of (M) exceeds 2 wt %, elevation of the temperature of (X') to 60° C. or higher may cause occurrence of aggregates. While the conditions of heating at the time of melting are not particularly limited as long as (A) is melted, there may, for example, be mentioned a method of heating under stirring at preferably 40 to 100° C., more preferably 60 to 90° C., and particularly preferably 60 to 80° C. for preferably 1 to 300 minutes.

Meanwhile, as a method of film-forming treatment, there may be obtained the resin particles (C) having flatter and smoother surfaces by heat-treating the nonaqueous dispersion (X') of resin particles (C) in which the content of the organic solvent (M) is 2 wt % or less and melting (A) on the core layer. The temperature of the heat-treatment is preferably in a range of not lower than the Tg of the resin (a) and not higher than 80° C. If the heat-treatment temperature is lower than the Tg of (a), there is almost no change in the surface flatness and smoothness of the resin particles (C) obtained. On the other hand, when heat-treated at a temperature exceeding 80° C., the shell layer may sometimes peel off from the core layer.

Among these methods of forming films of (A), preferable are the method of melting (A), and a combination of the method of dissolving (A) and the method of melting (A).

The content of the organic solvent (M) in the nonaqueous dispersion (X) of resin particles of the present invention, after distilling off the organic solvent (M) from the nonaqueous dispersion (X') of resin particles, is preferably 1 wt % or less, and more preferably 0.5 wt % or less. In addition, a portion (a low-boiling component) of (L) may be distilled off together with the organic solvent (M).

The method to distill off the organic solvent (M) includes, for example, a method to distill under a reduced pressure of 20 to 500 mmHg at a temperature of not less than 20° C. and not more than the boiling point of (M).

With regard to the control of the shape of the resin particles (C) which constitute the nonaqueous dispersion (X) of resin particles of the present invention, the shape and the surface property of the particles can be controlled by regulating the difference between the SP values of the resin (a) and the resin (b), or the molecular weight of the resin (a). If the difference between the SP values is small, particles having a distorted shape and a flat and smooth surface are easy to obtain. Furthermore, if the difference between the SP values is large, particles having a spherical shape and a rough surface become easy to obtain. Further, if the molecular weight of the resin (a) is large, particles having a rough surface are easy to obtain; and when the molecular weight is small, particles having a flat and smooth surface become easy to obtain. However, if the difference between the SP values of (a) and (b) is either too small or too large, granulation becomes difficult. In addition, if the molecular weight of (a) is too small, granulation becomes difficult. For these reasons, the difference between the SP values of (a) and (b) is preferably 0.01 to 5.0, more preferably 0.1 to 3.0, and particularly preferably 0.2 to 2.0. Additionally, the Mw of the resin (a) is preferably 100 to 1,000,000, more preferably 1,000 to 500,000, particularly preferably 2,000 to 200,000, and most preferably 3,000 to 100,000.

As a method to add the above-described additives to the shell layer or the core layer, these may be mixed when (X') is formed. However, it is more preferable to mix the resin (a) or the resin (b) with the additives beforehand and, thereafter, add and disperse the mixture in the nonhydrophilic medium.

Furthermore, in the present invention, the additives need not necessarily be added at the time of formation of particles in (X'), and may be added after the particles are formed. For example, after forming particles which do not contain colorants, the colorants may be added by a heretofore known method of dyeing and, also, the particles may be impregnated with the above-described additives together with the organic solvents (u) and/or the plasticizers (v).

The nonaqueous dispersion (X) of resin particles of the present invention contains therein resin particles having uniform particle diameters and shapes. Therefore, the nonaqueous dispersion (X) of resin particles of the present invention is useful for use in paints, oil-based ink for inkjet printers, ink for electronic paper, cosmetics, spacers for manufacturing electronic parts, and electrorheological fluids. When used in these applications, heretofore known dyes, pigments, and magnetic powders may be added as colorants to the resin particles (C).

The amount of use of the colorant is, when dyes or pigments are used, preferably 0.5 to 15 wt % based on the weight of the resin (b) and, when magnetic powders are used, preferably 20 to 150 wt %.

The charge-controlling agents for controlling the electrostatic property of the resin particles (C) include nigrosine-type dyes, triphenylmethane-type dyes, metal complex dyes containing chromium, chelate pigments of molybdic acid, rhodamine-type dyes, alkoxy-type amines, quaternary ammonium salts (including fluorine-modified quaternary ammonium salts), alkylamides, elementary phosphorous or compounds thereof, elementary tungsten or compounds thereof, fluorine-containing surfactants, metal salts of salicylic acid, metal salts of salicylic acid derivatives, and the like.

The amount of use of the charge-controlling agent is preferably 0 to 5 wt % based on the weight of the resin (b).

EXAMPLES

Hereinafter, the present invention will be described further with reference to Examples, but the invention is by no means limited thereto. In the following description, the term "parts" means parts by weight.

Production Example 1

Production of Polyester Resin

To a reaction vessel equipped with a stirrer, a heating and cooling equipment, a thermometer, a condenser, and a nitrogen inlet tube, 286 parts of dodecanedioic acid, 190 parts of 1,6-hexanediol, and 1 part of titanium dihydroxybis(triethanolaminate) as a condensation catalyst were added and the mixture was reacted at 180° C. under nitrogen flow for 8 hours while distilling off generated water. Subsequently, while elevating the temperature gradually to 220° C. and distilling off the generated water, the reaction was carried out for 4 hours under nitrogen flow and further for 1 hour under reduced pressure of 5 to 20 mmHg to obtain a polyester resin. The polyester resin had a melting point of 68° C., an Mn of 4,900, and an Mw of 10,000.

Production Example 2

Production of Urethane Resin

To a reaction vessel equipped with a stirrer, a heating and cooling equipment, and a thermometer, 66 parts of 1,4-butanediol, 86 parts of 1,6-hexanediol, and 40 parts of methyl ethyl ketone were added and dissolved uniformly by stirring. To this solution was added 248 parts of hexamethylene diisocyanate (HDI) and the mixture was reacted at 80° C. for 5 hours. Thereafter, methyl ethyl ketone was distilled off under reduced pressure of 300 mmHg to obtain a urethane resin. The urethane resin had a melting point of 57° C., an Mn of 4,500, an Mw of 9,700 and a hydroxyl value of 36.

Production Example 3

Production of Urethane-Modified Polyester Resin

To a reaction vessel equipped with a stirrer, a heating and cooling equipment, a thermometer, and an equipment for solvent removal, 500 parts of methyl ethyl ketone and 464 parts of a polyester, "HS2H-350S" (produced by Hokoku Corporation), comprising 714 parts of sebacic acid and 1,6-hexanediol and having a hydroxyl value of 32, were added and the mixture was dissolved at 80° C. To this was added 16 parts of 2,6-tolylenediisocyanate and, after the mixture was reacted at 80° C. for 5 hours, methyl ethyl ketone was distilled off under reduced pressure of 300 mmHg to obtain a urethane-modified polyester. The NCO content of the urethane-modified polyester resin was 1.14 wt %.

Production Example 4

Production of Fine Particle Dispersion (W1) of Resin Particles (A)

To a reaction vessel equipped with a stirrer, a heating and cooling equipment, a thermometer, a dropping funnel, an equipment for solvent removal, and a nitrogen inlet tube, 195 parts of THF was added. To a glass beaker, a mixture of 100 parts of behenyl acrylate, 30 parts of methacrylic acid, 70 parts of an equimolar reaction product of hydroxyethyl methacrylate and phenyl isocyanate, and 0.5 part of azobis(methoxydimethylvaleronitrile) was added and mixed by stirring at 20° C. to prepare a monomer solution, which was added to the dropping funnel. After the gas phase of the reaction vessel was replaced with nitrogen, the monomer solution was dropwise added under an airtight condition at 70° C. over 1 hour. After 3 hours from completion of the dropwise addition, a mixture of 0.05 part of azobis(methoxydimethylvaleronitrile) and 5 parts of THF was added. After a reaction at 70° C. for 3 hours, the reaction mixture was cooled to room temperature to obtain a copolymer solution. This copolymer solution (400 parts) was dropwise added to 600 parts of liquid paraffin [relative permittivity: 2.0, SP value: 8.6 $(cal/cm^3)^{1/2}$] under stirring and THF was distilled off under reduced pressure of 300 mmHg at 40° C. to obtain a fine particle dispersion (W1). The volume average particle diameter of the fine particle dispersion (W1) as measured by "LA-920" was 0.12 μm and the contact angle of the resin (a) as measured by the above-described method relative to liquid paraffin was 8.8°.

Production Example 5

Production of Fine Particle Dispersion (W2) of Resin Particles (A)

Except that the monomer solution in Production Example 4 was changed to a monomer solution comprising 40 parts of methyl methacrylate, 40 parts of methacrylic acid, 5 parts of hydroxyethyl methacrylate, and 0.5 part of azobis(methoxydimethylvaleronitrile), a copolymer solution was obtained in the same manner as in Production Example 4. To this copolymer solution (400 parts) were added 115 parts of the after-mentioned urethane-modified polyester obtained in Production Example 5 and 0.1 part of dibutyltin oxide, and the mixture was reacted at 50° C. for 5 hours. The reaction product was dropwise added to 600 parts of liquid paraffin [relative permittivity: 2.0, SP value: 8.6 $(cal/cm^3)^{1/2}$] under stirring and THF was distilled off under reduced pressure of 300 mmHg at 40° C. to obtain a fine particle dispersion (W2). The volume average particle diameter of the fine particle dispersion (W2) was 0.13 μm and the contact angle of the resin (a) relative to liquid paraffin was 10.5°.

Production Example 6

Production of Fine Particle Dispersion (W3) of Resin Particles (A)

Except that the monomer solution in Production Example 4 was changed to a monomer solution comprising 30 parts of methyl methacrylate, 128 parts of behenyl acrylate, 32 parts of 2-decyltetradecyl methacrylate, 10 parts of an equimolar reaction product of hydroxyethyl methacrylate and phenyl isocyanate, and 0.5 part of azobis(methoxydimethylvaleronitrile), a fine particle dispersion (W3) was obtained in the same manner as in Production Example 4. The volume average particle diameter of the fine particle dispersion (W3) was 0.14 μm and the contact angle of the resin (a) relative to liquid paraffin was 25.4°.

Production Example 7

Production of Fine Particle Dispersion (W4) of Resin Particles (A)

Except that the monomer solution in Production Example 4 was changed to a monomer solution comprising 20 parts of methyl methacrylate, 20 parts of methacrylic acid, 48 parts of stearyl acrylate, 32 parts of 2-decyltetradecyl methacrylate, 40 parts of dimethylaminoethyl methacrylate, 40 parts of polyethylene glycol methacrylate, "Blenmer AE-400" (produced by NOF Corporation), and 0.5 part of azobis(methoxydimethylvaleronitrile), a fine particle dispersion (W4) was obtained in the same manner as in Production Example 4. The volume average particle diameter of the fine particle dispersion (W4) was 0.13 μm and the contact angle of the resin (a) relative to liquid paraffin was 32.0°.

Production Example 8

Production of Fine Particle Dispersion (W5) of Resin Particles (A)

To a reaction vessel equipped with a stirrer, a heating and cooling equipment, a thermometer, a dropping funnel, an equipment for solvent removal, and a nitrogen inlet tube, 195 parts of THF was added. To a glass beaker, a mixture of 80 parts of behenyl acrylate, 30 parts of methacrylic acid, 90 parts of an equimolar reaction product of hydroxyethyl methacrylate and phenyl isocyanate, and 0.5 part of azobis(methoxydimethylvaleronitrile) was added and mixed by stirring at 20° C. to prepare a monomer solution, which was added to the dropping funnel. After the gas phase of the reaction vessel was replaced with nitrogen, the monomer solution was dropwise added under an airtight condition at 70° C. over 1 hour. After 3 hours from completion of the dropwise addition, a mixture of 0.05 part of azobis(methoxydimethylvaleronitrile) and 5 parts of THF was added. After a reaction at 70° C. for 3 hours, the reaction mixture was cooled to room temperature to obtain a copolymer solution. This copolymer solution (400 parts) was dropwise added to 600 parts of liquid paraffin [relative permittivity: 2.0, SP value: 8.6 $(cal/cm^3)^{1/2}$] under stirring and THF was distilled off under reduced pressure of 300 mmHg at 40° C. to obtain a fine particle dispersion (W5). The volume average particle diameter of the fine particle dispersion (W5) as measured by "LA-920" was 0.125 μm and the contact angle of the resin (a) relative to liquid paraffin was 24.8°.

Production Example 9

Production of Fine Particle Dispersion (W6) of Resin Particles (A)

Except that the monomer solution in Production Example 4 was changed to a monomer solution comprising 80 parts of behenyl acrylate, 10 parts of methyl methacrylate, 10 parts of methacrylic acid, 10 parts of hydroxyethyl methacrylate, and 0.5 part of azobis(methoxydimethylvaleronitrile), a copolymer solution was obtained in the same manner as in Production Example 4. To 200 parts of this copolymer solution, a solution of 180 parts of the polyester resin obtained in Production Example 1 dissolved in 120 parts of THF and 4 parts of tolylene diisocyanate were added, and the mixture was reacted at 70° C. for 5 hours. The reaction product was dropwise added to 600 parts of liquid paraffin [relative permittivity: 2.0, SP value: 8.6 $(cal/cm^3)^{1/2}$] under stirring and THF was distilled off under reduced pressure of 300 mmHg at 40° C. to obtain a fine particle dispersion (W6). The volume average particle diameter of the fine particle dispersion (W6) was 0.13 μm and the contact angle of the resin (a) relative to liquid paraffin was 32.5°.

Production Example 10

Production of Fine Particle Dispersion (W7) of Resin Particles (A)

Except that the monomer solution in Production Example 4 was changed to a monomer solution comprising 80 parts of behenyl acrylate, 50 parts of methyl methacrylate, 10 parts of methacrylic acid, 15 parts of hydroxyethyl methacrylate, and 0.5 part of azobis(methoxydimethylvaleronitrile), a copolymer solution was obtained in the same manner as in Production Example 4. To 200 parts of this copolymer solution, a solution of 60 parts of the polyester resin obtained in Production Example 1 dissolved in 120 parts of THF and 1.3 parts of tolylene diisocyanate were added, and the mixture was reacted at 70° C. for 5 hours. The reaction product was dropwise added to 600 parts of liquid paraffin [relative permittivity: 2.0, SP value: 8.6 $(cal/cm^3)^{1/2}$] under stirring and THF was distilled off under reduced pressure of 300 mmHg at 40° C. to obtain a fine particle dispersion (W7). The volume average particle diameter of the fine particle dispersion (W7) was 0.14 μm and the contact angle of the resin (a) relative to liquid paraffin was 38°.

Production Example 11

Production of Fine Particle Dispersion (W8) of Resin Particles (A)

Except that "180 parts of the polyester resin obtained in Production Example 1" in Production Example 9 was changed to "170 parts of the urethane resin obtained in Production Example 2," a fine particle dispersion (W8) was obtained in the same manner as in Production Example 9. The volume average particle diameter of the fine particle dispersion (W8) was 0.135 μm and the contact angle of the resin (a) relative to liquid paraffin was 36°.

Production Example 12

Production of Fine Particle Dispersion (W9) of Resin Particles (A)

Except that "60 parts of the polyester resin obtained in Production Example 1" in Production Example 10 was changed to "57 parts of the urethane resin obtained in Production Example 2," a fine particle dispersion (W9) was obtained in the same manner as in Production Example 10. The volume average particle diameter of the fine particle dispersion (W9) was 0.145 μm and the contact angle of the resin (a) relative to liquid paraffin was 41°

Production Example 13

Production of Fine Particle Dispersion (W10) of Resin Particles (A)

Except that the monomer solution in Production Example 4 was changed to a monomer solution comprising 60 parts of behenyl acrylate, 38 parts of 2-decyltetradecyl methacrylate, 30 parts of methacrylic acid, 70 parts of an equimolar reaction product of hydroxyethyl methacrylate and phenyl isocyanate, and 0.5 part of azobis(methoxydimethylvaleronitrile), a fine particle dispersion (W10) was obtained in the same manner as in Production Example 4. The volume average particle diameter of the fine particle dispersion (W10) as measured by "LA-920" was 0.10 μm and the contact angle of the resin (a) relative to liquid paraffin was 10.8°.

Production Example 14

Production of Fine Particle Dispersion (W11) of Resin Particles (A)

Except that the monomer solution in Production Example 4 was changed to a monomer solution comprising 53 parts of behenyl acrylate, 25 parts of 2-decyltetradecyl methacrylate, 30 parts of methacrylic acid, 70 parts of an equimolar reaction product of hydroxyethyl methacrylate and phenyl isocyanate, and 0.5 part of azobis(methoxydimethylvaleronitrile), a fine particle dispersion (W11) was obtained in the same manner as in Production Example 4. The volume average particle diameter of the fine particle dispersion (W11) as measured by "LA-920" was 0.12 μm and the contact angle of the resin (a) relative to liquid paraffin was 30°.

Production Example 15

Production of Fine Particle Dispersion (W12) of Resin Particles (A)

Except that the monomer solution in Production Example 4 was changed to a monomer solution comprising 53 parts of behenyl acrylate, 25 parts of 2-decyltetradecyl methacrylate, 30 parts of methacrylic acid, 70 parts of an equimolar reaction product of hydroxyethyl methacrylate and phenyl isocyanate, and 0.5 part of azobis(methoxydimethylvaleronitrile), a copolymer solution was obtained in the same manner as in Production Example 4. To 200 parts of this copolymer solution, a solution of 57 parts of the urethane obtained in Production Example 2 dissolved in 120 parts of THF and 1.3 parts of tolylene diisocyanate were added, and the mixture was reacted at 70° C. for 5 hours. The reaction product was dropwise added to 600 parts of liquid paraffin [relative permittivity: 2.0, SP value: 8.6 $(cal/cm^3)^{1/2}$] under stirring and THF was distilled off under reduced pressure of 300 mmHg at 40° C. to obtain a fine particle dispersion (W12). The volume average particle diameter of the fine particle dispersion (W12) as measured by "LA-920" was 0.125 μm and the contact angle of the resin (a) relative to liquid paraffin was 35°.

Production Example 16

Production of Fine Particle Dispersion (W13) of Resin Particles (A)

To a reaction vessel equipped with a stirrer, a heating and cooling equipment, a thermometer, a dropping funnel, an equipment for solvent removal, and a nitrogen inlet tube, 195 parts of THF was added. To a glass beaker, a mixture of 100 parts of behenyl acrylate, 30 parts of methacrylic acid, 70 parts of an equimolar reaction product of hydroxyethyl methacrylate and phenyl isocyanate, and 0.05 part of azobis(methoxydimethylvaleronitrile) was added and mixed by stirring at 20° C. to prepare a monomer solution, which was added to the dropping funnel. After the gas phase of the reaction vessel was replaced with nitrogen, the monomer solution was dropwise added under an airtight condition at 70° C. over 1 hour. After 3 hours from completion of the dropwise addition, a mixture of 0.05 part of azobis(methoxydimethylvaleronitrile) and 5 parts of THF was added. After reaction at 70° C. for 3 hours, the reaction mixture was cooled to room temperature to obtain a copolymer solution. This copolymer solution (400 parts) was dropwise added to 600 parts of liquid paraffin [relative permittivity: 2.0, SP value: 8.6 $(cal/cm^3)^{1/2}$] under stirring and THF was distilled off under reduced pressure of 300 mmHg at 40° C. to obtain a fine particle dispersion (W13). The volume average particle diameter of the fine particle dispersion (W13) as measured by "LA-920" was 0.12 μm and the contact angle of the resin (a) as measured by the above-described method relative to liquid paraffin was 18.5°.

Production Example 17

Production of Fine Particle Dispersion (W14) of Resin Particles (A)

To a reaction vessel equipped with a stirrer, a heating and cooling equipment, a thermometer, a dropping funnel, an equipment for solvent removal, and a nitrogen inlet tube, 195 parts of THF was added. To a glass beaker, a mixture of 50 parts of behenyl acrylate, 40 parts of acrylic acid, 110 parts of an equimolar reaction product of hydroxyethyl methacrylate and phenyl isocyanate, and 0.10 part of azobis(methoxydimethylvaleronitrile) was added and mixed by stirring at 20° C. to prepare a monomer solution, which was added to the dropping funnel. After the gas phase of the reaction vessel was replaced with nitrogen, the monomer solution was dropwise added under an airtight condition at 70° C. over 1 hour. After 3 hours from completion of the dropwise addition, a mixture of 0.05 part of azobis(methoxydimethylvaleronitrile) and 5 parts of THF were added. After reaction at 70° C. for 3 hours, the reaction mixture was cooled to room temperature to obtain a copolymer solution. This copolymer solution (400 parts) was dropwise added to 600 parts of liquid paraffin [relative permittivity: 2.0, SP value: 8.6 $(cal/cm^3)^{1/2}$] under stirring and THF was distilled off under reduced pressure of 300 mmHg at 40° C. to obtain a fine particle dispersion (W14). The volume average particle diameter of the fine particle dispersion (W14) as measured by "LA-920" was 0.12 μm and the contact angle of the resin (a) as measured by the above-described method relative to liquid paraffin was 12.5°.

Production Example 18

Production of Resin Solution (1)

To a reaction vessel equipped with a stirrer, a heating and cooling equipment, a thermometer, and a nitrogen inlet tube, 746 parts (2.1 mole parts) of bisphenol A PO 2 moles adduct, 288 parts (1.7 mole parts) of terephthalic acid, and 3 parts of tetrabutoxy titanate as a condensation catalyst were added. After condensation-polymerizing the mixture under normal pressure at 230° C. for 6 hours, the pressure of the system was reduced and, when the acid value became 1.0, the pressure was returned to normal pressure and the system was cooled to 180° C. At 180° C., 28 parts (0.1 mole part) of trimellitic anhydride was added and reacted at the same temperature for 1 hour to obtain a polyester resin, resin (b1). The resin (b1) had a Tg of 72° C., an Mn of 2,400, a hydroxyl value of 40, and an acid value of 15. Subsequently, 1,000 parts of the resin (b1) and 1,000 parts of acetone were added to a beaker and dissolved uniformly by stirring to obtain a resin solution (1).

Production Example 19

Production of Resin Solution (2)

To a reaction vessel equipped with a stirrer, a heating and cooling equipment, a thermometer, an equipment for solvent removal, and a nitrogen inlet tube, 701 parts (18.8 mole parts) of 1,2-propylene glycol (hereinafter abbreviated as PG), 716 parts (7.5 mole parts) of dimethyl terephthalate, 180 parts (2.5 mole parts) of adipic acid, and 3 parts of tetrabutoxy titanate as a condensation catalyst were added. The mixture was reacted at 180° C. under nitrogen flow for 8 hours while distilling off methanol and, thereafter, while elevating the temperature gradually to 230° C., the reaction was carried out under nitrogen flow for 4 hours with PG and water being distilled off. Further, the reaction was conducted under reduced pressure and the content was taken out when the softening point thereof reached 150° C. to obtain a polyester resin, resin (b2). The amount of recovered PG was 316 parts (8.5 mole parts). The resin (b2) had a Tg of 64° C., an Mn of 8,800, a hydroxyl value of 13, and an acid value of 0.2.

Subsequently, 1,000 parts of the resin (b2) and 1,000 parts of acetone were added to a beaker and dissolved uniformly by stirring to obtain a resin solution (2).

Production Example 20

Production of Resin Solution (3)

To a pressure-resistant reaction vessel equipped with a stirrer, a heating and cooling equipment, a thermometer, an equipment for solvent removal, and a nitrogen inlet tube, 452 parts of xylene was added and the atmosphere was replaced with nitrogen. Thereafter, at 170° C., a monomer solution prepared by mixing 845 parts of styrene and 155 parts of n-butyl acrylate and a solution obtained by mixing 6.4 parts of di-t-butyl peroxide, the initiator, and 125 parts of xylene were each added thereto dropwise over 3 hours. After the dropwise addition, the reaction mixture was aged at 170° C. for 1 hour and by distilling off xylene under reduced pressure of 20 mmHg, there was obtained a vinyl resin, resin (b3). The resin (b3) had a Tg of 60° C. and an Mn of 14,000.

Subsequently, 1,000 parts of the resin (b3) and 1,000 parts of acetone were added to a beaker and dissolved uniformly by stirring to obtain a resin solution (3).

Production Example 21

Production of Resin Solution (4)

To a reaction vessel equipped with a stirrer, a heating and cooling equipment, and a thermometer, 177 parts of a polyester (Mn: 1,000) obtained from adipic acid and 1,4-butanediol (mole ratio being 1:1), 7 parts of PG, 72 parts of dimethylolpropionic acid, and 500 parts of acetone were added and dissolved uniformly by stirring. To this solution was added 246 parts of isophorone diisocyanate (IPDI) and the mixture was reacted at 55° C. for 11 hours. Subsequently, 9 parts of ethylenediamine and 6 parts of n-butylamine were added at 55° C. and an extension reaction was carried out for 4 hours to obtain an acetone solution [a resin solution (4)] of a urethane resin, resin (b4). The resin (b4) had a Tg of 62° C., a softening initiation temperature of 105° C., and a flow initiation temperature of 180° C.

Production Example 22

Production of Resin Solution (5)

To a reaction vessel equipped with a stirrer, a heating and cooling equipment, a thermometer, and a nitrogen inlet tube, 746 parts (2.1 mole parts) of bisphenol A PO 2 moles adduct, 288 parts (1.7 mole parts) of terephthalic acid, and 3 parts of tetrabutoxy titanate as a condensation catalyst were added. After the mixture was condensation-polymerized under normal pressure at 230° C. for 6 hours, the pressure of the system was reduced and, when the acid value became 1.0, the pressure was returned to normal pressure and the system was cooled to 180° C. At 180° C., 7 parts (0.1 mole part) of trimellitic anhydride was added and reacted at the same temperature for 1 hour to obtain a polyester resin, resin (b5). The resin (b5) had a Tg of 72° C., an Mn of 2,400, a hydroxyl value of 51, and an acid value of 4.

Subsequently, 1,000 parts of the resin (b5) and 1,000 parts of acetone were added to a beaker and dissolved uniformly by stirring to obtain a resin solution (5).

Production Example 23

Production of Resin Solution (6)

To a reaction vessel equipped with a stirrer, a heating and cooling equipment, a thermometer, and a nitrogen inlet tube, 746 parts (2.1 mole parts) of bisphenol A PO 2 moles adduct, 288 parts (1.7 mole parts) of terephthalic acid, and 3 parts of tetrabutoxy titanate as a condensation catalyst were added. After the mixture was condensation-polymerized under normal pressure at 230° C. for 6 hours, the pressure of the system was reduced and, when the acid value became 1.0, the pressure was returned to normal pressure and the system was cooled to 180° C. At 180° C., 60 parts (0.1 mole part) of trimellitic anhydride was added and reacted at the same temperature for 1 hour to obtain a polyester resin, resin (b6). The resin (b6) had a Tg of 72° C., an Mn of 2,400, a hydroxyl value of 51, and an acid value of 31.

Subsequently, 1,000 parts of the resin (b6) and 1,000 parts of acetone were added to a beaker and dissolved uniformly by stirring to obtain a resin solution (6).

Production Example 24

Production of Urethane Prepolymer

To a reaction vessel equipped with a stirrer, a heating and cooling equipment, an equipment for water removal, and a thermometer, 2,000 parts of polycaprolactonediol, "PLACCEL L220AL" (produced by Daicel Corporation) having a hydroxyl value of 56 was added, heated to 110° C., and dehydrated under reduced pressure of 20 mmHg for 1 hour. Subsequently, 457 parts of IPDI was added and the mixture was reacted at 110° C. for 10 hours to obtain a urethane prepolymer having isocyanate groups at terminals. The NCO content of the urethane prepolymer was 3.6 wt %.

Production Example 25

Production of Curing Agent

To a reaction vessel equipped with a stirrer, a heating and cooling equipment, and a thermometer, 50 parts of ethylenediamine and 300 parts of methyl isobutyl ketone were added and the mixture was reacted at 50° C. for 5 hours to obtain a ketimine compound, a curing agent.

Production Example 26

Production of Colorant Dispersion

To a beaker were added 25 parts of copper phthalocyanine, 4 parts of a colorant dispersant, "Solsperse 71000" (produced by Lubrizol Corporation), and 75 parts of acetone and the mixture was dispersed uniformly by stirring. Thereafter, copper phthalocyanine was micro-dispersed by a bead mill to obtain a colorant dispersion. The volume average particle diameter of the colorant dispersion was 0.2 μm.

Example 1

To a beaker were added 45 parts of the resin solution (1) and 15 parts of the colorant dispersion obtained in Production Example 26 and the mixture was stirred at 8,000 rpm and dispersed uniformly at 25° C. by using TK Auto Homomixer (manufactured by Tokushu Kika Kogyo Co., Ltd.) to obtain a resin solution (1A).

To another beaker were added 67 parts of liquid paraffin and 6 parts of the fine particle dispersion (W1), and the mixture was dispersed uniformly. Subsequently, while stirring at 10,000 rpm at 25° C. by using TK Auto Homomixer, 60 parts of the resin solution (1A) was added and the mixture was stirred for 2 minutes. Then, this mixture was added to a reaction vessel equipped with a stirrer, a heating and cooling equipment, a thermometer, and an equipment for solvent removal. After elevating the temperature to 35° C., acetone was distilled off at the same temperature and under reduced pressure of 300 mmHg until the acetone concentration became 0.5 wt % or less to obtain a nonaqueous dispersion of resin particles (X-1). Furthermore, the concentration of acetone in (X-1) was quantified by means of gas chromatography "GC 2010" (FID system; manufactured by Shimadzu Corporation) (hereinafter, the same shall apply). Solubility of (a) in (L) at 25° C. was 3 wt %, the (a) being contained in (X-1).

Examples 2 to 14

Comparative Examples 1 to 5

Except that resin solutions, a urethane prepolymer, a curing agent, a colorant dispersion, liquid paraffin, fine particle dispersions shown in Table 1 and Table 2 were used, nonaqueous dispersions (X-2) to (X-14) of the present invention and comparative nonaqueous dispersions (CX-1) to (CX-5) were obtained in the same manner as in Example 1.

Each of the nonaqueous dispersions (X-1) to (X-14) and (CX-1) to (CX-5) obtained in Examples 1 to 14 and Comparative Examples 1 to 5, respectively, was each diluted in liquid paraffin and the particle size distribution of the resin particles (C) was measured by using "LA-920." Additionally, the state of the fine particles (A) in the resin particles (C) was observed by the following method. The extent of surface coverage of the resin particle (B) with the fine particles (A) in the resin particles (C) was measured by the above-described method. Furthermore, with the nonaqueous dispersion of resin particles, the fixing properties and the heat-resistant stability were evaluated by the following methods. The results are shown in Tables 1 and 2.

[State of Fine Particle (A) in Resin Particles (C)]

The surface of the resin particles (C) were observed by a scanning electron microscope (SEM) and it was determined whether the fine particles (A) adhered to or formed a film on the surface of the resin particle (B).

[Fixing Property 1]

The nonaqueous dispersion of resin particles was dripped on paper and coated uniformly by using a bar coater (#10, having a gap of 22.9 μm) (other methods may be used as long as uniform coating can be achieved). A cold offset-occurring temperature was measured when this paper was passed though pressure rollers under conditions of a fixing speed (circumferential velocity of a heating roller) of 213 mm/second and fixing pressure (pressure of the pressure roller) of 10 kg/cm². The lower cold offset-occurring temperature indicates the better fixing property.

[Fixing Property 2]

After a peeling tape, "Scotch mending tape" (manufactured by Sumitomo 3M, Ltd.), was adhered on the image fixed in the [Fixing Property 1], the tape was peeled off and the temperature at which removal of the image occurred was measured. The lower temperature of occurrence of image removal indicates the better fixing property.

[Heat-Resistant Stability]

After standing the nonaqueous dispersion of resin particles at 50° C. for 3 days, the particle diameter was measured and a percent change in the particle diameter was calculated according to the following formula:

percent change in particle diameter (%)=[(particle diameter after standing at 50° C. for 3 days)−(particle diameter before standing at 50° C. for 3 days)]/(particle diameter before standing at 50° C. for 3 days)

The smaller percent change indicates the better fixing property.

TABLE 1

| | | Example | | | | | | | | |
|---|---|---|---|---|---|---|---|---|---|---|
| | | 1 (X-1) | 2 (X-2) | 3 (X-3) | 4 (X-4) | 5 (X-5) | 6 (X-6) | 7 (X-7) | 8 (X-8) | 9 (X-9) |
| Resin solution | No. | (1) | (2) | (3) | (1) | (1) | (1) | (1) | (1) | (1) |
| | Amount used | 45 | 36 | 49.2 | 40 | 45 | 45 | 45 | 45 | 45 |
| Urethane prepolymer | | — | — | — | 2.5 | — | — | — | — | — |
| Curing agent | | — | — | — | 0.1 | — | — | — | — | — |
| Colorant dispersion | | 15 | 15 | 15 | 15 | 15 | 15 | 15 | 15 | 15 |
| Liquid paraffin | | 67 | 62.5 | 69.1 | 67 | 67 | 67 | 67 | 67 | 67 |
| Fine particle dispersion | No. | (W1) | (W2) | (W1) | (W1) | (W5) | (W6) | (W7) | (W8) | (W9) |
| | Amount used | 6 | 15 | 1.8 | 6 | 6 | 6 | 6 | 6 | 6 |
| Solubility of (a) in (L) (wt %) | | 3 | 7 | 3 | 3 | 10 | 2 | 9 | 1 | 8 |
| Contact angle between (a) and liquid paraffin (degree) | | 8.8 | 10.5 | 8.8 | 8.8 | 24.8 | 32.5 | 38 | 37 | 41 |
| Volume average particle diameter of (a) (μm) | | 0.12 | 0.13 | 0.12 | 0.12 | 0.125 | 0.13 | 0.14 | 0.135 | 0.145 |
| Content of (P) in (C) (wt %) | | 10 | 25 | 2 | 30 | 10 | 10 | 10 | 10 | 10 |
| Volume average particle diameter of (C) (μm) | | 1.2 | 1.3 | 1.3 | 1.6 | 1.3 | 1.3 | 1.4 | 1.4 | 1.5 |
| State of fine particles (A) in (C) | | Film formation | Film formation | Film formation | Film formation | Film formation | Film formation | Film formation | Film formation | Film formation |
| Extent of surface coverage of (B) with (A) (%) | | 95 | 85 | 95 | 90 | 80 | 90 | 85 | 90 | 85 |
| Fixing property 1 (° C.) | | 105 | 110 | 105 | 110 | 110 | 110 | 105 | 115 | 110 |
| Fixing property 2 (° C.) | | 115 | 120 | 115 | 120 | 115 | 115 | 115 | 120 | 115 |
| Heat-resistant stability (%) | | 5 | 10 | 4 | 7 | 15 | 5 | 9 | 6 | 10 |

TABLE 2

| | Example | | | | | Comparative Example | | | | |
|---|---|---|---|---|---|---|---|---|---|---|
| | 10 (X-10) | 11 (X-11) | 12 (X-12) | 13 (X-13) | 14 (X-14) | 1 (X'-1) | 2 (X'-2) | 3 (X'-3) | 4 (X'-4) | 5 (X'-5) |
| Resin solution No. | (4) | (5) | (6) | (1) | (1) | (1) | (1) | (1) | (1) | (1) |
| Amount used | 45 | 45 | 45 | 45 | 45 | 45 | 45 | 45 | 45 | 45 |
| Urethane prepolymer | — | — | — | — | — | — | — | — | — | — |
| Curing agent | — | — | — | — | — | — | — | — | — | — |
| Colorant dispersion | 15 | 15 | 15 | 15 | 15 | 15 | 15 | 15 | 15 | 15 |
| Liquid paraffin | 67 | 67 | 67 | 67 | 67 | 67 | 67 | 67 | 67 | 67 |
| Fine particle dispersion No. | (W1) | (W1) | (W1) | (W13) | (W14) | (W3) | (W4) | (W10) | (W11) | (W12) |
| Amount used | 6 | 6 | 6 | 6 | 6 | 6 | 6 | 6 | 6 | 6 |
| Solubility of (a) in (L) (wt %) | 3 | 3 | 3 | 1 | 0 | 15 | 20 | 12 | 12 | 11 |
| Contact angle between (a) and liquid paraffin (degree) | 8.8 | 8.8 | 8.8 | 18.5 | 12.5 | 25.4 | 32 | 10.8 | 30 | 35 |
| Volume average particle diameter of (a) (μm) | 0.12 | 0.12 | 0.12 | 0.12 | 0.12 | 0.14 | 0.13 | 0.10 | 0.12 | 0.125 |
| Content of (P) in (C) (wt %) | 10 | 10 | 10 | 10 | 10 | 10 | 10 | 10 | 10 | 10 |
| Volume average particle diameter of (C) (μm) | 1.2 | 1.3 | 1.2 | 1.3 | 1.3 | 1.2 | 1.8 | 1.1 | 1.3 | 1.4 |
| State of fine particles (A) in (C) | Film formation | Film formation | Film formation | Adhesion | Adhesion | Film formation | Film formation | Film formation | Film formation | Film formation |
| Extent of surface coverage of (B) with (A) (%) | 85 | 90 | 90 | 85 | 85 | 45 | 35 | 45 | 45 | 45 |
| Fixing property 1 (° C.) | 110 | 105 | 110 | 105 | 110 | 125 | 130 | 120 | 130 | 130 |
| Fixing property 2 (° C.) | 120 | 110 | 115 | 110 | 115 | 135 | 140 | 135 | 135 | 140 |
| Heat-resistant stability (%) | 5 | 4 | 5 | 7 | 5 | 35 | 83 | 26 | 36 | 42 |

INDUSTRIAL APPLICABILITY

The nonaqueous dispersion (X) of resin particles of the present invention is effective for use in paint; liquid developers for electrophotography, electrostatic recording, electrostatic printing, and the like; oil-based ink for inkjet printer; and ink for electronic paper. Furthermore, it is also useful in other applications such as cosmetics, spacers for production of electronic parts, electrorheological fluids, and the like.

The invention claimed is:

1. A nonaqueous dispersion (X) of resin particles in which resin particles (C) are dispersed in a nonhydrophilic organic solvent (L) that exhibits a relative permittivity of 1 to 4 at 20° C., the resin particles (C) being core-shell type resin particles each of which comprises a resin particle (B) that contains a resin (b) and fine particles (A) that contain a resin (a) and that either adhere to the surface of the resin particle (B) or form a film on the surface of the resin particle (B), wherein the solubility of (a) in (L) at 25° C. is 2 wt % to 10 wt % relative to the weight of (a).

2. The nonaqueous dispersion (X) according to claim 1, wherein a volume average particle diameter of (C) is 0.01 μm to 100 μm and a coefficient of variation is 1 to 100%.

3. The nonaqueous dispersion (X) according to claim 1, wherein an average value of circularity R (average circularity) of (C) is 0.92 to 1.0.

4. The nonaqueous dispersion (X) according to claim 1, wherein (a) is a vinyl resin, a polyester resin, a polyurethane resin, an epoxy resin, or a combination thereof.

5. The nonaqueous dispersion (X) according to claim 1, wherein (a) is a vinyl resin having a (co)polymer skeleton of a vinyl monomer and, if necessary, other vinyl monomers.

6. The nonaqueous dispersion (X) according to claim 5, wherein the vinyl monomer is a vinyl monomer (m) having a molecular chain (k).

7. The nonaqueous dispersion (X) according to claim 6, wherein (m) is at least one selected from a vinyl monomer (m1) having a linear hydrocarbon chain having 12 to 27 carbon atoms, a vinyl monomer (m2) having a branched hydrocarbon chain having 12 to 27 carbon atoms, a vinyl monomer (m3) having a fluoroalkyl chain having 4 to 20 carbon atoms, and a vinyl monomer (m4) having a polydimethylsiloxane chain.

8. The nonaqueous dispersion (X) according to claim 1, wherein (b) is at least one selected from a vinyl resin, a polyester resin, a polyurethane resin, and an epoxy resin.

9. The nonaqueous dispersion (X) according to claim 1, wherein (B) contains wax (c) and/or modified wax (d) having vinyl polymer chains grafted thereto.

10. The nonaqueous dispersion (X) according to claim 1, wherein, in the resin particles (C), an extent of surface coverage of the resin particle (B) with the fine particles (A) is 50% or more.

11. The nonaqueous dispersion (X) according to claim 1, which is for use in paint, a liquid developer for electrophotography, a liquid developer for electrostatic recording, oil-based ink for inkjet printer, or ink for electronic paper.

12. A method for producing a nonaqueous dispersion (X) of resin particles according to claim 1, in which resin particles (C) each of which comprising fine particles (A) adhered to or forming a film on the surface of a resin particle (B) are dispersed in a nonhydrophilic organic solvent (L), comprising mixing a fine particle dispersion (W) comprising the fine particles (A) that contain a resin (a) dispersed in the nonhydrophilic organic solvent (L) that exhibits a relative permittivity of 1 to 4 at 20° C., and a resin solution (O1) having a resin (b) dissolved in an organic solvent (M) with a solubility parameter of 8.5 to 20 $(cal/cm^3)^{1/2}$ or a resin solution (O2) having a precursor (b0) of the resin (b) dissolved in (M); dispersing (O1) or (O2) in (W) and, when (O2) is used, reacting (b0) further to form the resin particle (B) containing (b) in (W), thereby to obtain a nonaqueous dispersion (X') of the resin particles (C) having a structure wherein the fine particles (A) are adhered to the surface of the resin particle (B); and further distilling off (M) from (X').

13. The nonaqueous dispersion (X) according to claim 1, wherein the solubility is measured by a method comprising:
a step in which a nonaqueous resin dispersion (10g) is centrifuged at 25° C. at 10,000 rpm for 30 minutes and all of a first supernatant liquid is recovered to obtain a residual solid; and a step of adding 10 mL of (L) to the residual solid to form a supernatant liquid.

* * * * *